United States Patent [19]
Yamamuro

[11] Patent Number: 5,956,309
[45] Date of Patent: Sep. 21, 1999

[54] OPTICAL DISK DEVICE AND REPLACEMENT PROCESSING METHOD

[75] Inventor: Mikio Yamamuro, Yokohama, Japan

[73] Assignee: Kabushiki Kaisha Toshiba, Kawashi, Japan

[21] Appl. No.: 09/100,492

[22] Filed: Jun. 22, 1998

Related U.S. Application Data

[62] Division of application No. 08/822,490, Mar. 24, 1997, Pat. No. 5,805,547.

[30] Foreign Application Priority Data

Mar. 25, 1996 [JP] Japan ................................ 8-068528

[51] Int. Cl.$^6$ .................................................... G11B 7/00
[52] U.S. Cl. .................................. 369/58; 369/59; 369/47
[58] Field of Search .................................. 369/58, 47, 48, 369/49, 50, 54, 59, 32; 360/48, 51, 53

[56] References Cited

U.S. PATENT DOCUMENTS

| | | | |
|---|---|---|---|
| 4,730,290 | 3/1988 | Takasago et al. | 369/32 |
| 4,742,507 | 5/1988 | Kuroki et al. | 369/54 |
| 4,774,700 | 9/1988 | Satoh et al. | 369/54 |
| 4,791,622 | 12/1988 | Clay et al. | 369/59 |
| 4,821,254 | 4/1989 | Satoh et al. | 369/54 |

(List continued on next page.)

FOREIGN PATENT DOCUMENTS

| | | |
|---|---|---|
| 0 420 211 | 4/1991 | European Pat. Off. . |
| 60-186926 | 9/1985 | Japan . |
| 60-202573 | 10/1985 | Japan . |
| 62-20141 | 1/1987 | Japan . |
| 1-140476 | 6/1989 | Japan . |
| 3-205661 | 9/1991 | Japan . |
| 4-28061 | 1/1992 | Japan . |
| 4-67471 | 3/1992 | Japan . |
| 4-141721 | 5/1992 | Japan . |

(List continued on next page.)

OTHER PUBLICATIONS

Toshiba Corp. Partial Translation of Jpn. Appln. Kokai Publication No. Hei 8–129458.

"Improving Direct Access Storage Device Reclaim," IBM Technical Disclosure Bulletin, vol. 30, No. 4, Sep. 1987, pp. 1850–1851.

Gregory Hite, "Disk Sparing Methods Affect Capacity And Transfer Rates," *Computer Technology Review*, pp. 39–42 and 44.

Andrew D. Hospodor, "The Changing Nature of Disk Controllers," *Proceedings of IEEE*, vol. 81, No. 4, Apr. 1993, pp. 586–594.

"High–Speed Formatting Operation for a Disk File," *IBM Technical Disclosure Bulletin*, vol. 36, No. 08, Aug. 1993, pp. 673–674.

Hashimoto, Abstract of JP Appln. No. 4–114371.

European Search Report, dated Aug. 18, 1998.

*Primary Examiner*—Muhammad N. Edun
*Attorney, Agent, or Firm*—Pillsbury Madison & Sutro LLP

[57] ABSTRACT

An apparatus and method for detecting and replacing a defective sector on an optical disk. Recording data and error correction data are recorded on an optical disk at a manufacturing time or an initial time. The recorded data and the error correction data are reproduced in units of one sector. A defective sector is determined when address data in an address field cannot be reproduced or when a number of errors in at least one sector exceeds a specified value. Address data of the defective sector is recorded in a defect list on the optical disk. Recording data and error correction data are successively recorded on the optical disk in a plurality of successive block areas. Defective sectors are skipped and recording data and error correction data are recorded in a unit of one block beginning in a next sector area. When a defective sector is detected after recording the recording data and the error correction data at a time other that the initial time or the manufacturing time, the recording data and the error correction data are recorded in a block area being different than a block area containing the defective sector.

8 Claims, 18 Drawing Sheets

U.S. PATENT DOCUMENTS

| | | | |
|---|---|---|---|
| 4,835,757 | 5/1989 | Abiko | 369/54 |
| 4,841,498 | 6/1989 | Sugimura et al. | 369/32 |
| 4,885,735 | 12/1989 | Fukushima et al. | 369/59 |
| 4,935,825 | 6/1990 | Worrell et al. | 360/54 |
| 4,949,326 | 8/1990 | Takagi et al. | 369/54 |
| 4,986,668 | 1/1991 | Fukushima et al. | 369/59 |
| 5,111,444 | 5/1992 | Fukushima et al. | 369/58 |
| 5,130,969 | 7/1992 | Sako | 369/58 |
| 5,132,956 | 7/1992 | Ichikawa | 369/54 |
| 5,202,876 | 4/1993 | Takagi et al. | 369/58 |
| 5,233,584 | 8/1993 | Kulakowski et al. | 369/44.27 |
| 5,235,585 | 8/1993 | Bish et al. | 369/58 X |
| 5,237,553 | 8/1993 | Fukushima et al. | 369/58 |
| 5,271,018 | 12/1993 | Chan | 371/10.2 |
| 5,303,219 | 4/1994 | Kulakowski et al. | 369/54 |
| 5,319,626 | 6/1994 | Ozaki et al. | 369/54 |
| 5,319,627 | 6/1994 | Shinno et al. | 369/54 |
| 5,343,453 | 8/1994 | Ogino | 369/44.28 |
| 5,357,381 | 10/1994 | Yasuda et al. | 360/53 |
| 5,418,767 | 5/1995 | Gaudet et al. | 369/54 X |
| 5,442,614 | 8/1995 | Tamegai | 369/58 |
| 5,471,449 | 11/1995 | Kaneko et al. | 369/58 |
| 5,508,989 | 4/1996 | Funahashi et al. | 369/58 |
| 5,526,335 | 6/1996 | Tamegai | 369/58 |
| 5,528,571 | 6/1996 | Funahashi et al. | 369/58 |
| 5,541,903 | 7/1996 | Funahashi et al. | 369/54 |
| 5,553,045 | 9/1996 | Obata | 369/58 |
| 5,574,708 | 11/1996 | Kawakami | 369/58 |
| 5,666,335 | 9/1997 | Horibe | 369/32 |
| 5,715,221 | 2/1998 | Ito et al. | 369/54 |

FOREIGN PATENT DOCUMENTS

| | | | |
|---|---|---|---|
| 4-172662 | 6/1992 | Japan . | |
| 5-36210 | 2/1993 | Japan . | |
| 5-11424 | 7 5/1993 | | Japan . |
| 5-128734 | 5/1993 | Japan . | |
| 6-111479 | 4/1994 | Japan . | |
| 6-203480 | 7/1994 | Japan . | |
| 6-243591 | 9/1994 | Japan . | |
| 6-259886 | 9/1994 | Japan . | |
| 7-319636 | 12/1995 | Japan . | |

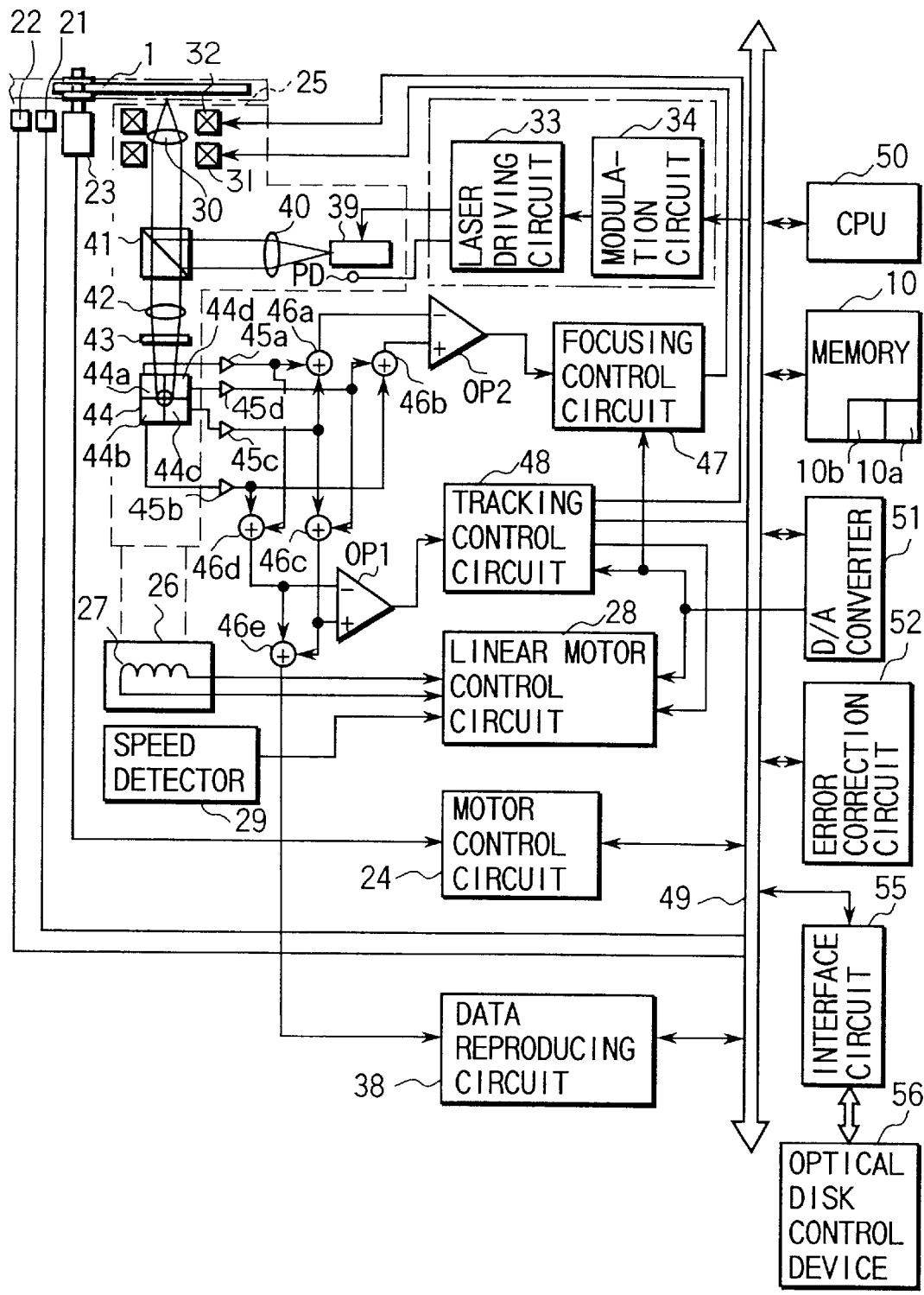
F I G. 1

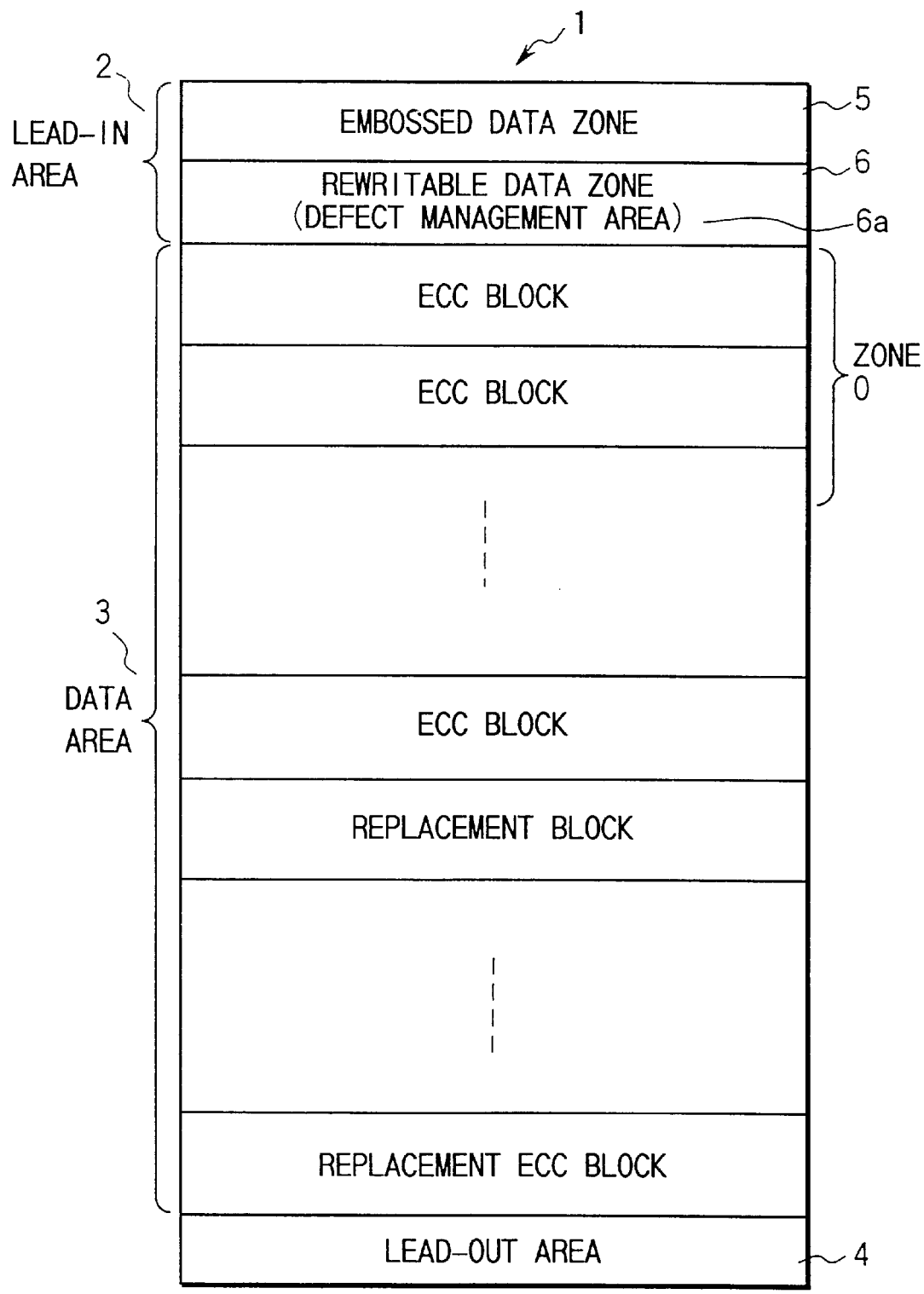
F I G. 3

| | | ROTATION SPEED(Hz) | NUMBER OF SECTORS PAR TRACK |
|---|---|---|---|
| LEAD-IN AREA | EMBOSSED DATA ZONE | 37.57 | 18 |
| | REWRITABLE DATA ZONE (DEFECT MANAGEMENT AREA) | 39.78 | 17 |
| DATA AREA | ZONE 0 | 39.78 | 17 |
| | ZONE 1 | 37.57 | 18 |
| | ZONE 2 | 35.59 | 19 |
| | ⋮ | ⋮ | ⋮ |
| | ZONE 23 | 16.91 | 40 |
| LEAD-OUT AREA | | 16.91 | 40 |

F I G. 4

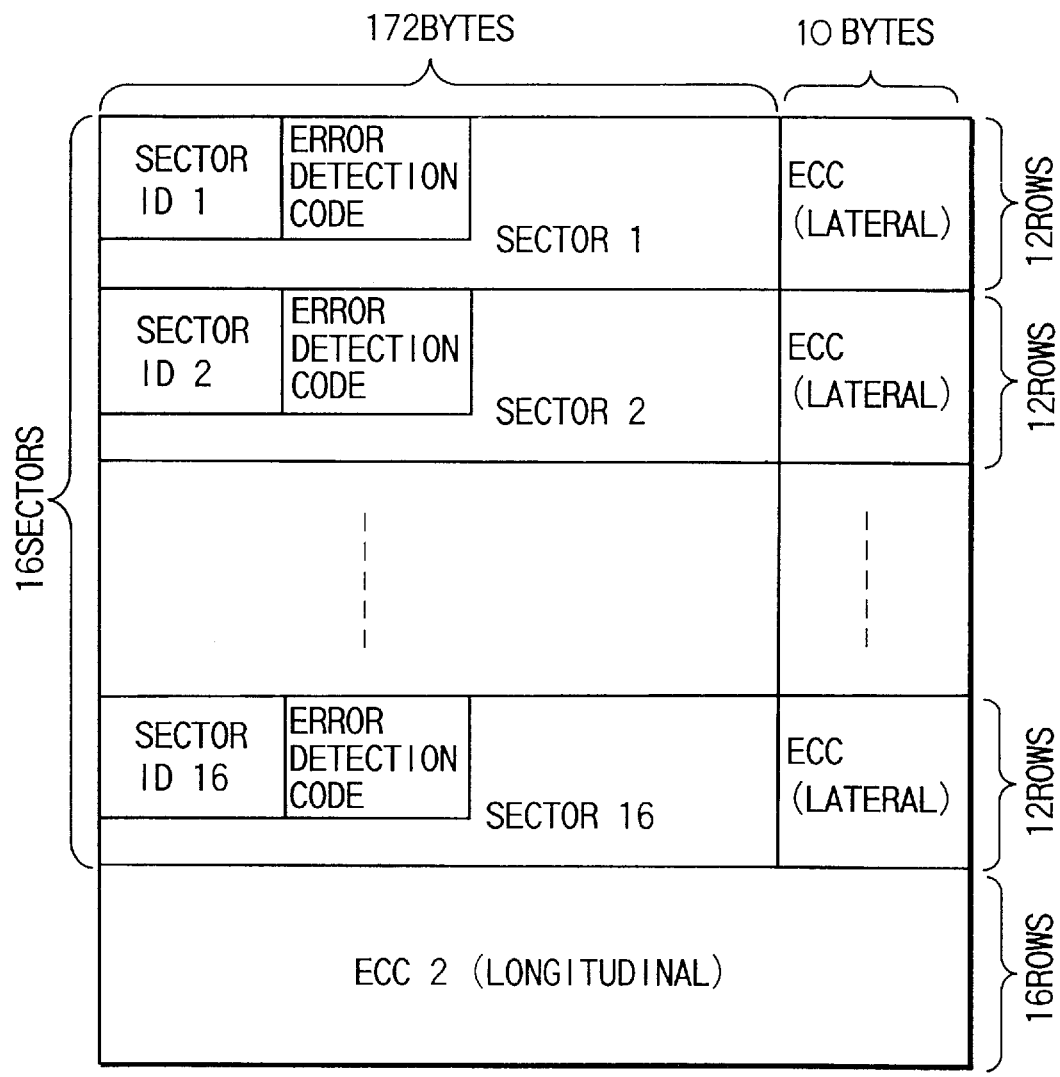
F I G. 5

| 2BYTE | 91BYTES | 2BYTE | 91BYTES | |
|---|---|---|---|---|
| SYNCHRO-NIZATION CODES | SECTOR 1 (1/2) | SYNCHRO-NIZATION CODES | SECTOR 1 (2/2) | 12 ROWS |
| | 1/16 ECC 2 | | 1/16 ECC 2 | 1 ROW |
| | SECTOR 2 (1/2) | | SECTOR 2 (2/2) | 12 ROWS |
| | 2/16 ECC 2 | | 2/16 ECC 2 | 1 ROW |
| | --- | | --- | |
| | SECTOR 16 (1/2) | | SECTOR 16 (2/2) | 12 ROWS |
| | 16/16 ECC 2 | | 16/16 ECC 2 | 1 ROW |

F I G. 6

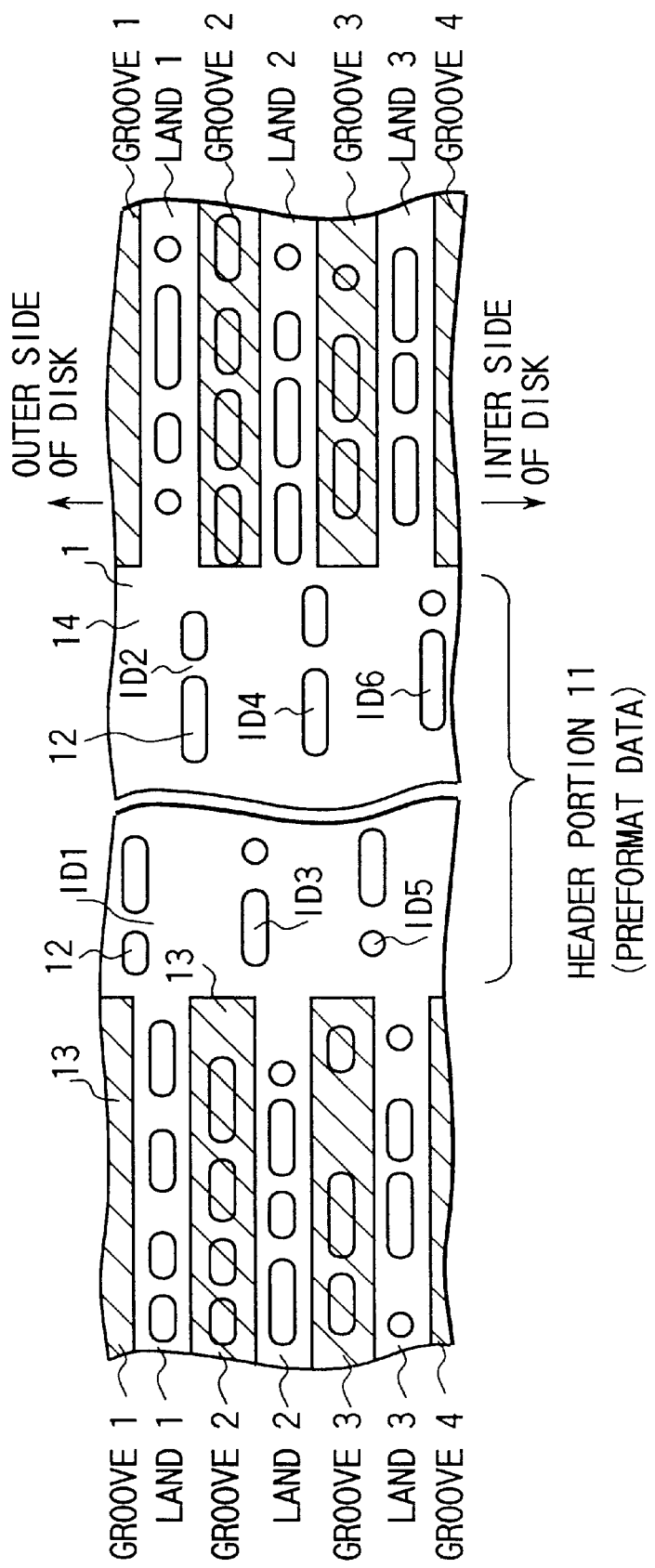
F I G. 8

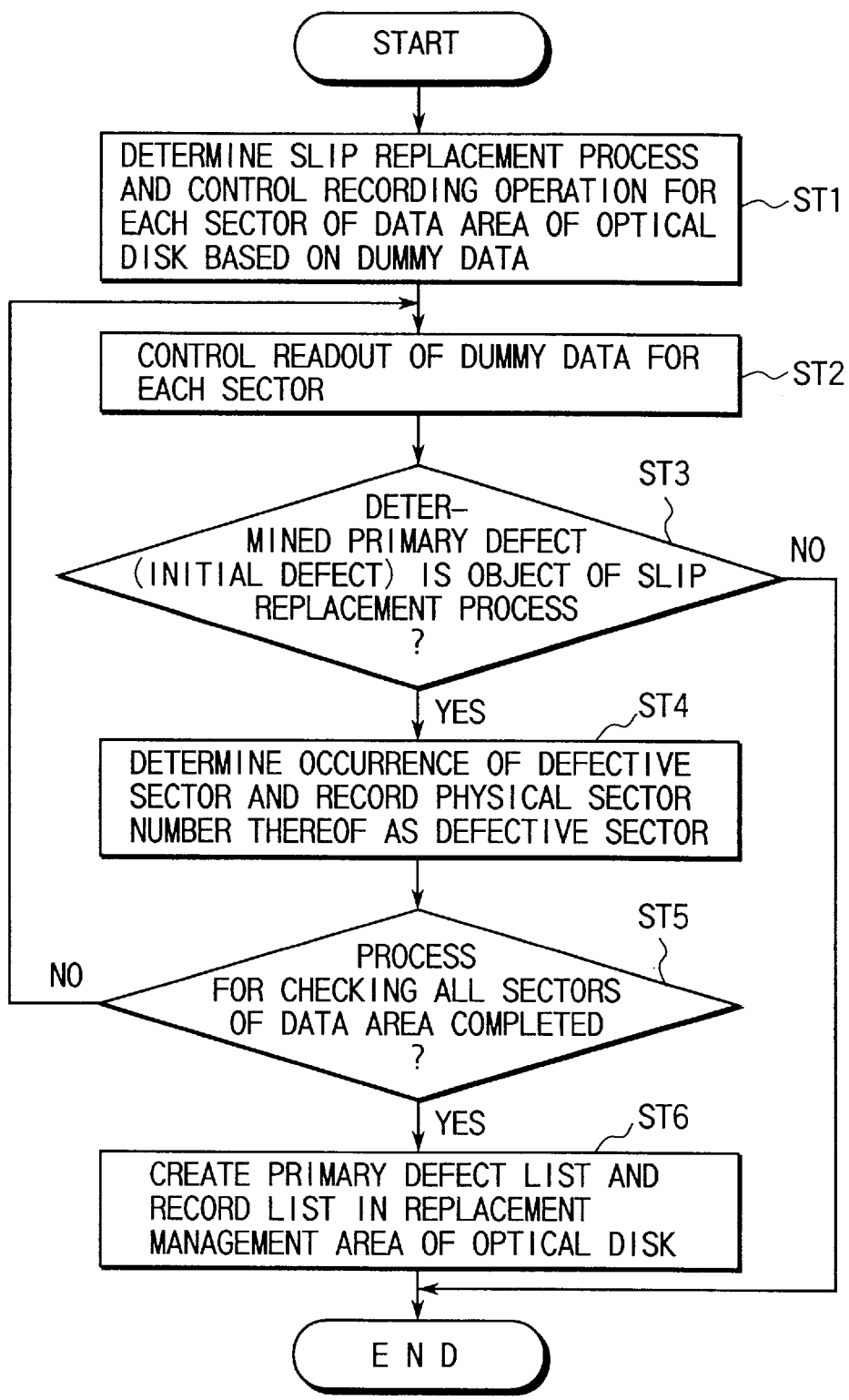
F I G. 1 2

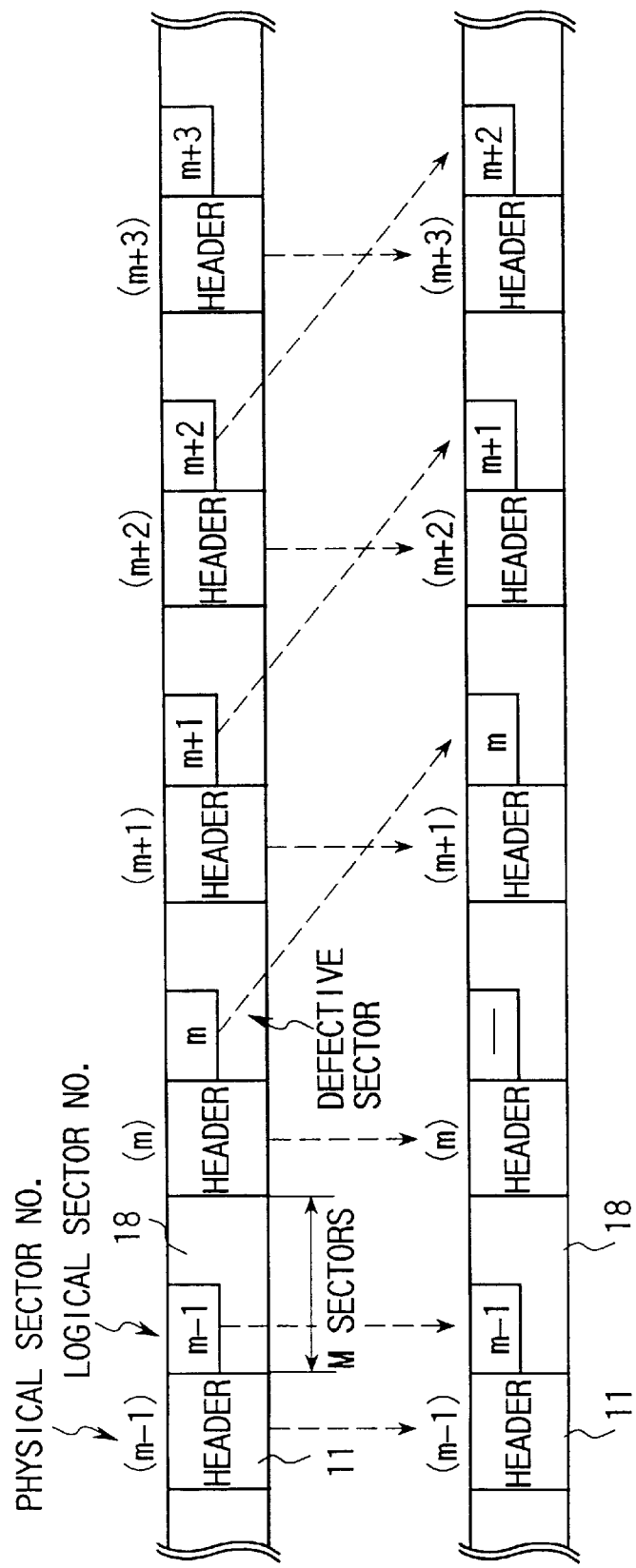
F I G. 1 3

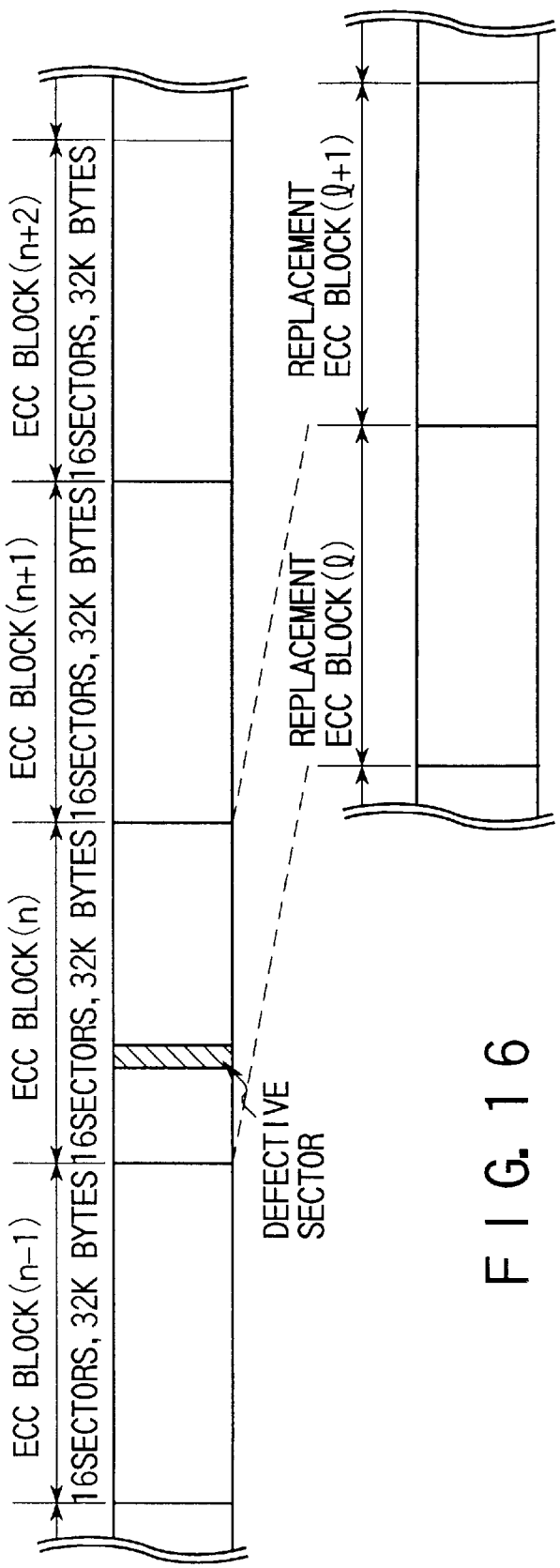
F I G. 16
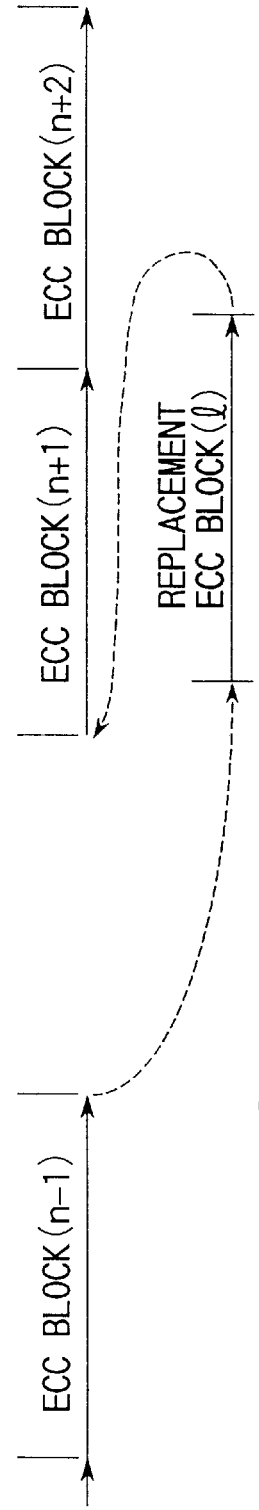
F I G. 17

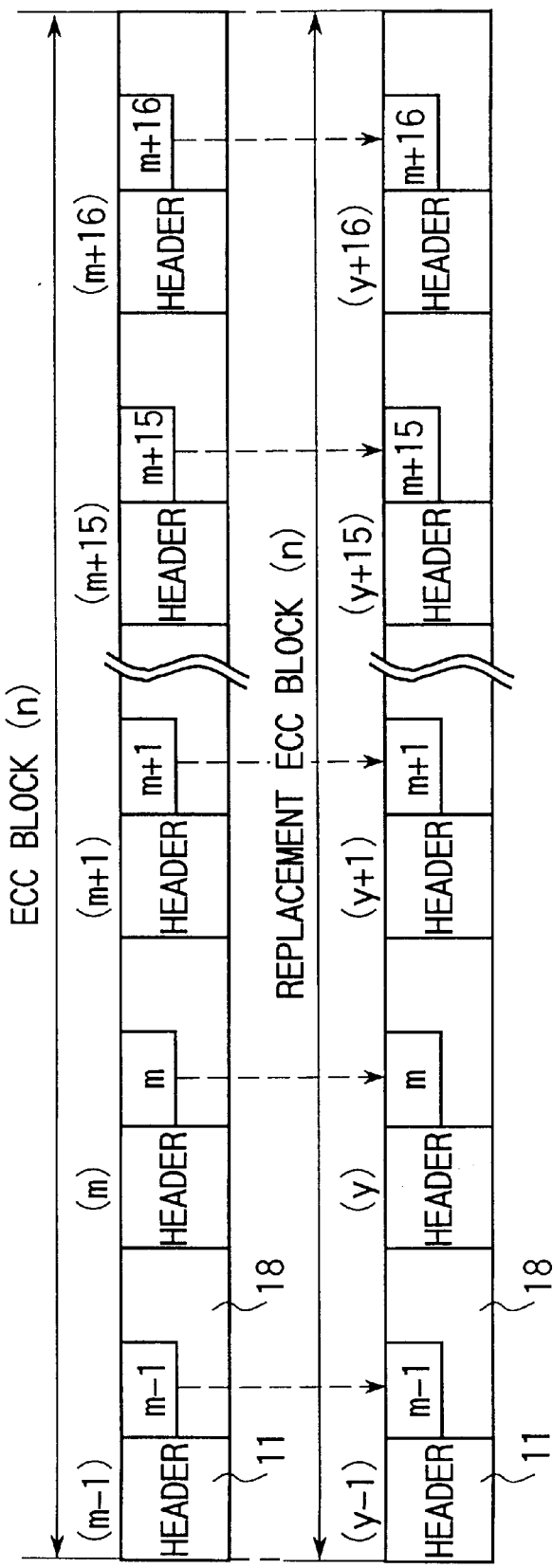
F I G. 18

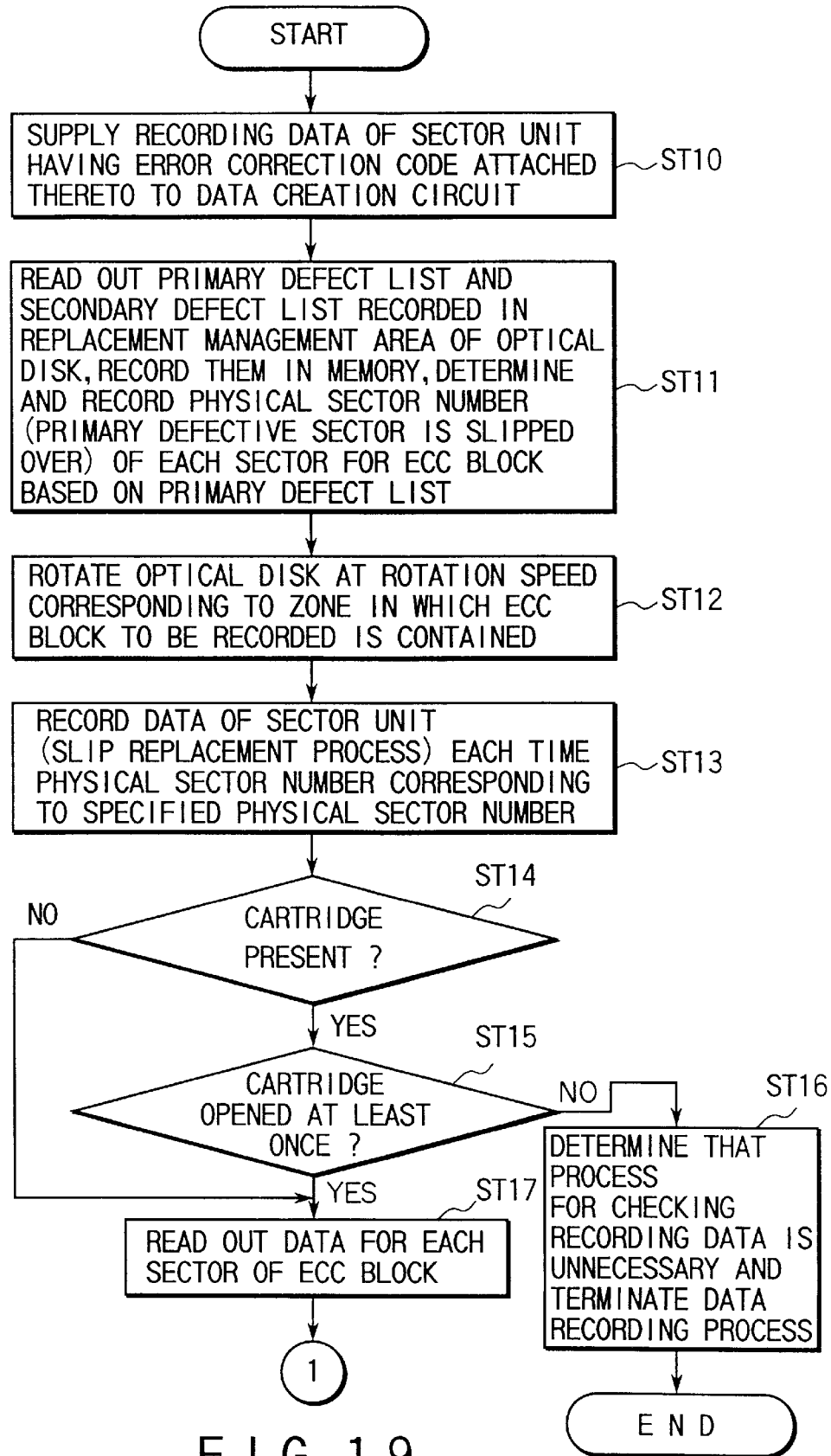
F I G. 19

OPTICAL DISK DEVICE AND REPLACEMENT PROCESSING METHOD

This is a division of application Ser. No. 08/822,490, filed Mar. 24, 1997, now U.S. Pat. No. 5,805,547.

BACKGROUND OF THE INVENTION

This invention relates to a recording and reproducing device for recording data on an optical disk and reproducing data recorded on the optical disk, a recording optical disk device exclusively used for recording data on an optical disk, a reproducing device exclusively used for reproducing data recorded on the optical disk, and a replacement processing method for effecting replacement process for a defect area or defect areas in the optical disk device.

Conventionally, an optical disk device for recording data on an optical disk having recording tracks or reproducing data recorded on the optical disk uses laser light emitted from a semiconductor laser oscillator mounted on an optical head.

With the above optical disk device, data is recorded on the optical disk in units of one ECC block, each block being constructed by a plurality of sectors.

In this case, an optical disk device is proposed in which whether or not data is correctly recorded in units of one sector is determined at manufacturing time or at an initial time such as the application starting time, and if a sector with a defect is detected by the above determination process, the ECC block containing the defective sector is classified as a defective block and is treated as an unusable block.

Therefore, when successive data items such as speeches or moving pictures are recorded and if an ECC block (defective block) which is unusable is present, a slip replacement process for recording data on a next ECC block after skipping over the defective ECC block is effected. That is, the data recording operation is interrupted for a period of time corresponding to one ECC block.

Thus, the conventional optical disk device has a problem such that the reproducing operation is interrupted for a period of time corresponding to one defective ECC block, for example, when successive data items such as speeches or moving pictures are reproduced.

Further, the conventional device has a process for determining whether or not data has been correctly recorded for each sector at the recording time after the initial time, dealing with a defective sector as an unusable sector if the defective sector is detected by the above determining process and recording data by using a sector prepared in a different area for replacement.

In this case, if data recorded on the sector of the different area is not simultaneously reproduced when one ECC block is reproduced, reproduction of the whole ECC block cannot be effected. That is, originally, the sectors of one ECC block can be successively reproduced, but in this case, it becomes necessary to reproduce the sector for replacement in the course of reproduction of the ECC block and then successively reproduce the sectors of the original ECC block. Therefore, the reproduction speed is lowered.

BRIEF SUMMARY OF THE INVENTION

An object of this invention is to provide an optical disk device capable of recording data to permit data to be continuously reproduced when successive data items such as speeches or moving pictures are reproduced even if a defect replacing process is effected at the manufacturing time or at the initial time, such as the application starting time.

Another object of this invention is to provide an optical disk device capable of continuously reproducing data when successive data items, such as speeches or moving pictures, are reproduced even if a defect replacing process is effected at the recording time after the initial time.

Still another object of this invention is to provide an optical disk device capable of continuously reproducing data when successive data items, such as speeches or moving pictures, are reproduced even if a defect replacing process is effected at the manufacturing time or at the initial time, such as the application starting time.

Further, another object of this invention is to provide an optical disk device capable of minimizing a reduction in the reproduction speed even it a defect replacing process is effected at the recording time after the initial time.

According to one aspect of this invention, there is provided a replacement processing method for an optical disk which has tracks arranged in a concentric or spiral form for data recording in which a format having a plurality of successive sector areas, each having a preset track length and including an address field for recording address data indicating the position on the track and a recording field for recording a recording data, is defined, and the recording data recording is effected in units of one each block area containing a group of a preset number of sector areas among the plurality of sector areas and including an error correction data recording area in which error correction data items used for reproducing data recorded in the preset number of sector areas are collectively recorded for the group of the preset number of sector areas, the method comprising the steps of successively recording the recording data and error correction data into a plurality of successive block areas on the optical disk, and skipping over a sector area having a defect in units of one sector area and recording the recording data and error correction data into a next sector area in a case where the recording data and error correction data is sequentially recorded into the plurality of sector areas in each of the block areas.

According to another aspect of this invention, there is provided a replacement processing method for an optical disk which has tracks arranged in a concentric or spiral form for data recording and in which a format having a plurality of successive sector areas, each having a preset track length and including an address field for recording address data indicating the position on the track and a recording field for recording a recording data, is defined, and the recording data recording is effected in units of one block area each block area containing a group of a preset number of sector areas among the plurality of sector areas and including an error correction data recording area in which error correction data items used for reproducing data recorded in the preset number of sector areas are collectively recorded for the group of the preset number of sector areas, comprising the steps of recording the recording data and error correction data into the recording field of each of the sector areas on the entire surface of the optical disk at the manufacturing time or at the initial time such as the application starting time, reproducing the recording data and error correction data in units of one sector area, comparing the reproduced recording data and error correction data with the recorded recording data and error correction data to determine a sector area with defect, recording address data of the sector which is determined to be defective, successively recording the recording data and error correction data into a plurality of successive block areas on the optical disk, and skipping over a sector area having a defect in units of one sector area based on the recorded address data and recording the recording data and error correction data into a next sector area in a case where the recording data and error correction data is sequentially recorded into the plurality of sector areas in each of the block areas.

According to still another aspect of this invention, there is provided an optical disk device for recording data on an optical disk which has tracks arranged in a concentric or spiral form for data recording and in which a format having a plurality of successive sector areas, each having a preset track length and including an address field for recording address data indicating the position on the track and a recording field for recording a recording data, is defined, and the recording data recording is effected in units of one block area containing a group of a preset number of sector areas among the plurality of sector areas and including an error correction data recording area in which error correction data items used for reproducing data recorded in the preset number of sector areas are collectively recorded for the group of the preset number of sector areas, comprising means for successively recording the recording data and error correction data into a plurality of successive block areas on the optical disk, and in a case where the recording data and error correction data is sequentially recorded into the plurality of sector areas in each of the block areas, skipping over a sector area having a defect in units of one sector area and recording the recording data and error correction data into a next sector area.

According to another aspect of this invention, there is provided an optical disk device for recording data on an optical disk which has tracks arranged in a concentric or spiral form for data recording and in which a format having a plurality of successive sector areas, each having a preset track length and including an address field for recording address data indicating the position on the track and a recording field for recording a recording data, is defined, and the recording data recording is effected in units of one block area each block area containing a group of a preset number of sector areas among the plurality of sector areas and including an error correction data recording area in which error correction data items used for reproducing data recorded in the preset number of sector areas are collectively recorded for the group of the preset number of sector areas, comprising first recording means for recording the recording data and error correction data into the data area of each of the sector areas on the entire surface of the optical disk at the manufacturing time or at the initial time, such as the application starting time, reproducing means for reproducing the recording data and error correction data recorded by the first recording means in units of one sector area, determining means for comparing the recording data and error correction data reproduced by the reproducing means with the recording data and error correction data recorded by the first recording means to detect a sector area having a defect, second recording means for recording address data of the sector which is determined to be defective by the determining means, and third recording means for successively recording the recording data and error correction data into a plurality of successive block areas on the optical disk, and in a case where the recording data and error correction data is sequentially recorded into the plurality of sector areas in each of the block areas, skipping over a sector area having a defect in units of one sector area based on address data recorded by the second recording means and then recording the recording data and error correction data into a next sector area.

According to still another aspect of this invention, there is provided an optical disk device for reproducing data recorded on an optical disk which has tracks arranged in a concentric or spiral form for data recording and in which a format having a plurality of successive sector areas, each having a preset track length and including an address field for recording address data indicating the position on the track and a recording field for recording a recording data, is defined, and the recording data recording is effected in units of one block area each block area containing a group of a preset number of sector areas among the plurality of sector areas and including an error correction data recording area in which error correction data items used for reproducing data recorded in the preset number of sector areas are collectively recorded for the group of the preset number of sector areas, comprising recording means for recording the address data of a sector area having a defect, and reproducing means for successively reproducing the recording data and error correction data from a plurality of successive block areas on the optical disk, and in a case where the recording data and error correction data is sequentially reproduced from the plurality of sector areas in each of the block areas, skipping over a sector area having a defect in units of one sector area based on address data recorded by the recording means and then reproducing the recording data and error correction data from a next sector area.

According to another aspect of this invention, there is provided a replacement processing method for an optical disk which has tracks arranged in a concentric or spiral form for data recording and in which a format having a plurality of successive sector areas, each having a preset track length and including an address field for recording address data indicating the position on the track and a recording field for recording a recording data, is defined, and the recording data recording is effected in units of one block area, each block area containing a group of a preset number of sector areas among the plurality of sector areas and including an error correction data recording area in which error correction data items used for reproducing data recorded in the preset number of sector areas are collectively recorded for the group of the preset number of sector areas, comprising the steps of successively recording data into a plurality of successive block areas on the optical disk at the manufacturing time or at the initial time, such as the application starting time, and in a case where data is sequentially recorded into the plurality of sector areas of each of the block areas, skipping over a sector area having a defect in units of one sector area and then recording data into a next sector area, successively recording the recording data and error correction data into the plurality of successive block areas on the optical disk at a time other than the initial time and sequentially recording the recording data and error correction data into the plurality of sector areas of each of the block areas, reproducing the recording data and error correction data recorded in the sector areas of each of the block areas, comparing the reproduced data with the recorded data and error correction data to detect a block area containing a defective sector area, and recording the recording data and error correction data in a different block area which is different from the block area containing the defective sector area.

According to another aspect of this invention, there is provided an optical disk device for recording data on an optical disk which has tracks arranged in a concentric or spiral form for data recording and in which a format having a plurality of successive sector areas, each having a preset track length and including an address field for recording address data indicating the position on the track and a recording field for recording a recording data, is defined, and the recording data recording is effected in units of one block area containing a group of a preset number of sector areas among the plurality of sector areas and including an error correction data recording area in which error correction data items used for reproducing data recorded in the preset number of sector areas are collectively recorded for the group of the preset number of sector areas, the device comprising first recording means for successively recording the recording data and error correction data into a plurality of successive block areas on the optical disk at the manufacturing time or at the initial time such as the application starting time, and in a case where the recording data and error correction data is sequentially recorded into the plurality of sector areas of each of the block areas, skipping over a sector area having a defect in units of one sector area and then recording the recording data and error correction data into a next sector area, second recording means for successively recording the recording data and error correction data into the plurality of successive block areas on the optical disk at a time other than the initial time and sequentially recording the recording data and error correction data into the plurality of sector areas of each of the block areas, reproducing means for reproducing the recording data and error correction data recorded in the sector areas of each of the block areas, determining means for comparing the recording data and error correction data reproduced by the reproducing means with the recorded data and error correction data to detect a block area containing a defective sector area, and third recording means for recording data and error correction data in a different block area which is different from the block area containing the defective sector area.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing the schematic construction of an optical disk device for explaining one embodiment of this invention;

FIG. 3 is a diagram showing the schematic construction of the optical disk shown in FIG. 1;

FIG. 4 is a diagram for explaining the rotation speed of the optical disk shown in FIG. 1 for each zone and the number of sectors in one track;

FIGS. 5 and 6 are diagrams each showing the construction of an ECC block of the optical disk shown in FIG. 1;

FIG. 8 is a view for illustrating preformat data in a header portion of the optical disk of FIG. 2;

FIG. 12 is a flowchart for illustrating an initial defect list forming process;

FIGS. 13 and 14 are diagrams showing the relation between physical sector numbers and logical sector numbers, for illustrating the slip replacement process in units of one sector;

FIG. 16 is a diagram for illustrating the linear replacement process in units of one ECC block;

FIG. 17 is a diagram for illustrating the reproducing order of the ECC blocks in the linear replacement process in units of one ECC block;

FIG. 18 is a diagram showing the relation between physical sector numbers and logical sector numbers in an ECC block for replacement when the linear replacement process in units of one ECC block is effected; and FIGS. 19 and 20 are flowcharts for illustrating the process effected when data is recorded in a preset ECC block.

DETAILED DESCRIPTION OF THE INVENTION

There will now be described an embodiment of this invention with reference to the accompanying drawings.

FIG. 1 shows an optical disk device used as an information recording device. The optical disk device is used to record data (information) or reproduce recorded data by applying converged light to an optical disk (DVD-RAM) 1 used as a recording medium.

For example, the disk 1 is a phase changing type rewritable disk, which is constructed by forming a metal coating layer of tellurium or bismuth in a doughnut form on the surface of a base plate which is formed of glass or plastics in a circular form, in which data is recorded or recorded data is reproduced by using concentric or spiral grooves and lands and on which address data items are recorded at preset intervals by use of recording marks in the mastering step.

Figure 2:
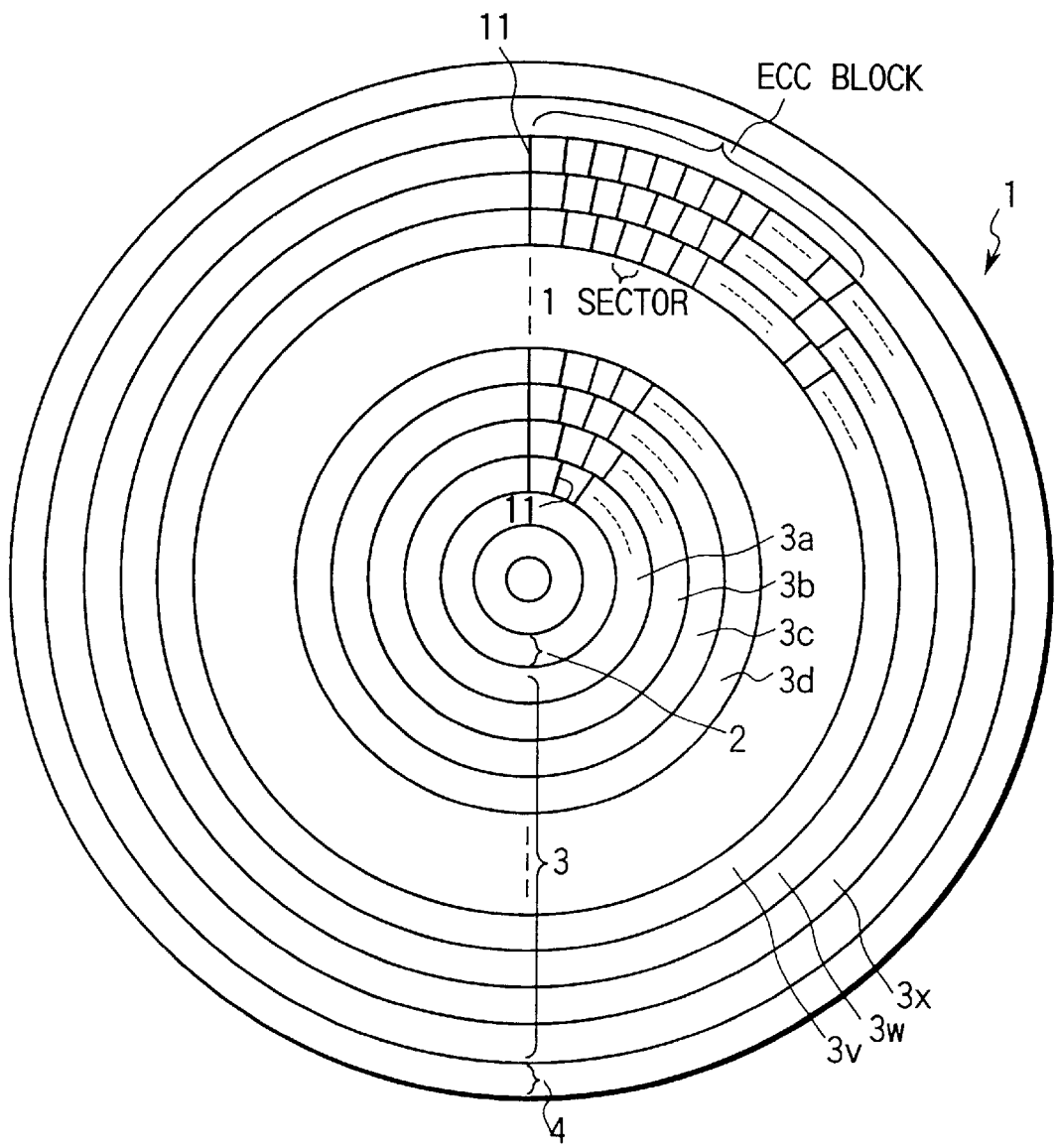
FIG. 2 is a plan view showing the schematic structure of an optical disk shown in FIG. 1.

As shown in FIGS. 2 and 3, the optical disk 1 has a lead-in area 2, data area 3 and lead-out area 4.

The lead-in area 2 has an embossed data zone 5 constructed by a plurality of tracks and a rewritable data zone 6 constructed by a plurality of tracks. In the embossed data zone 5, a reference signal and control data are recorded at the manufacturing time. The rewritable data zone 6 is constructed by a guard track zone, disk test zone, drive test zone, disk identification data zone, and a replacement management zone 6a used as a replacement management area.

The data area 3 is constructed by a plurality of zones, for example, 24 zones numbered 3a, . . . , 3x which are formed of a plurality of tracks arranged in a radial direction.

The lead-out area 4 is a rewritable data zone which is constructed by a plurality of tracks like the rewritable data zone 6 in which the same data as the recorded content of the data zone 6 can be recorded.

As shown in FIG. 3, the optical disk 1 has the embossed data zone 5 and rewritable data zone 6 of the lead-in area 2, the zones 3a, . . . , 3x of the data area 3 and the data zone of the lead-out area 4 sequentially arranged in this order from the innermost portion, the same clock signal is used for the above zones, and the rotation speed of the optical disk 1 and the number of sectors of one track are different in the respective zones.

In the zones 3a, . . . , 3x of the data area 3, the rotation speed becomes lower and the number of sectors of one track becomes larger as the zone lies at a farther distance from the innermost portion of the optical disk 1.

The relation between speed data (the rotation speed) and the number of sectors for the above zones 3a, . . . , 3x, 4, 5, 6 is recorded on a table 10a of a memory 10 as shown in FIG. 4.

As shown in FIGS. 2 and 3, in the tracks of the zones 3a, . . . , 3x of the data area 3, data items are previously recorded in the ECC (error correction code) block data unit (for example, in the unit of 38688 bytes) which is treated as the data recording unit.

The ECC block is constructed by 16 sectors in which 2k-byte data is recorded, and as shown in FIG. 5, each of sector ID (identification data) 1 to ID 16 of 4-byte (32-bit) configuration used as address data is attached to main data (sector data) together with an error detection code (IED: ID error detection code) of 2-byte configuration in each sector, and lateral ECCs (error correction codes) and longitudinal ECCs 2 used as error correction codes for reproducing data recorded in the ECC blocks are recorded. The ECCs 1 and 2 are error correction codes attached to data as redundant words for preventing data from being made unreproducible due to the defect of the optical disk 1.

A preset number of ECC blocks among a plurality of ECC blocks of the zones 3a, . . . , 3x of the data area 3 are used for replacement.

Each of the sectors is constructed by data of 172 bytes×12 rows, a lateral ECC of 10-byte configuration is attached for each row and a longitudinal ECC 2 of 182-byte configuration of one row is attached to each sector.

When the ECC block is recorded on the optical disk 1, synchronization codes (2 bytes: 32 channel bits) for attaining the byte synchronization when data is reproduced are attached for every preset amount of data (at preset data length intervals, for example, for every 91 bytes: for every 1456 channel bits) of each sector as shown in FIG. 6.

Figure 7:
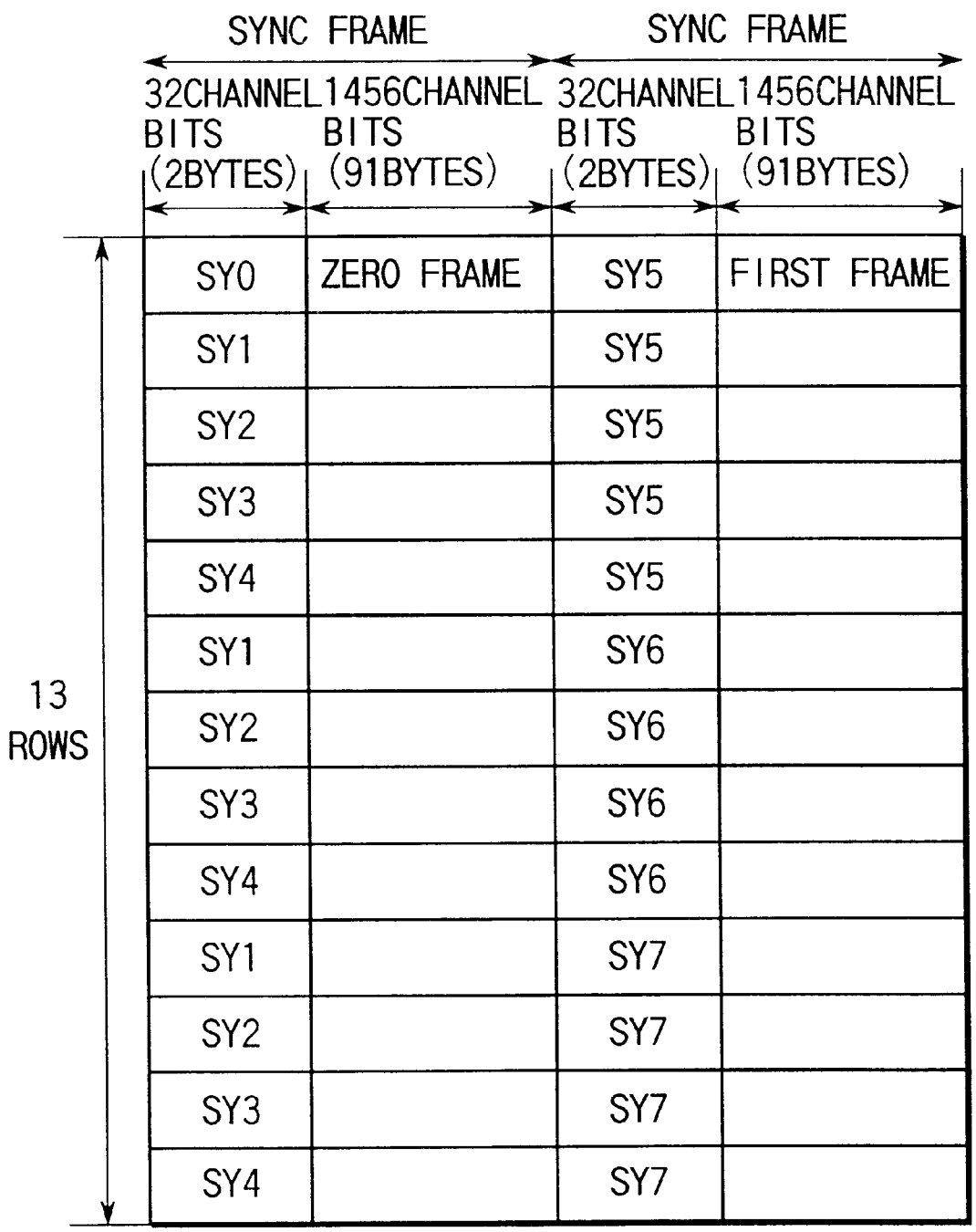
FIG. 7 is a diagram showing the construction of each sector of the ECC block of FIG. 6.

As shown in FIG. 7, each sector is constructed by 26 frames ranging from a zero frame to 25th frame and a sync. code (frame synchronization code) attached to each frame is constructed by a specified code (one byte: 16 channel bits) and a common code (one byte: 16 channel bits) which is common for each frame.

That is, as shown in FIG. 7, the zero frame is represented by SY0, the second, tenth and eighteenth frames are represented by SY1, the fourth, twelfth and twentieth frames are represented by SY2, the sixth, fourteenth and twenty-second frames are represented by SY3, the eighth, sixteenth and twenty-fourth frames are represented by SY4, the first, third, fifth, seventh and ninth frames are represented by SY5, the eleventh, thirteenth, fifteenth and seventeenth frames are represented by SY6, and the nineteenth, twenty-first, twenty-third and twenty-fifth frames are represented by SY7.

As shown in FIG. 2, in the tracks of the zones 3a, . . . , 3x of the data area 3, header portions (address field) 11, . . . in which addresses and the like are recorded are previously preformatted for respective sectors.

The header portion 11 is formed at the time of formation of the grooves. As shown in FIG. 8, the header portion 11 is formed of a plurality of pits 12 and pre-formatted for the grooves 13, and the center of the pit 12 lies on the same line as the boundary line between the groove 13 and the land 14.

As shown in FIG. 8, a pit train ID1 constructs the header portion of a groove 1, a pit train ID2 constructs the header portion of a land 1, a pit train ID3 constructs the header portion of a groove 2, a pit train ID4 constructs the header portion or a land 2, a pit train ID5 constructs the header portion of a groove 3, and a pit train ID6 constructs the header portion of a land 3.

Thus, the header portions for grooves and the header portions for lands are alternately (in a staggered form) arranged.

Figure 9:
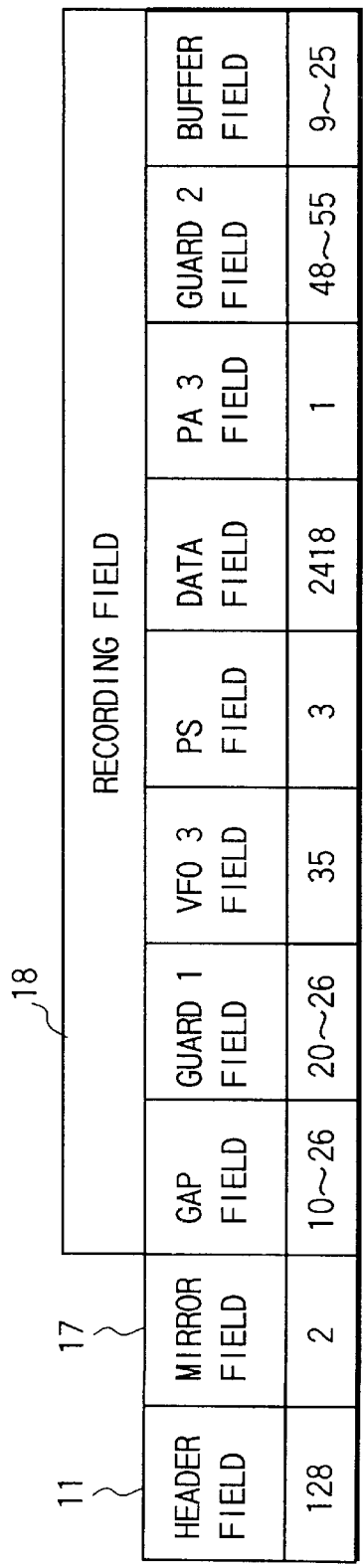
FIG. 9 is a diagram showing the sector format of the ECC block of FIG. 6.

The format for each sector is shown in FIG. 9.

In FIG. 9, one sector is constructed by 2697 bytes and is constructed by a header field of 128 bytes (corresponding to the header portion 11), a mirror field 17 of 2 bytes and a recording field 18 of 2567 bytes.

Channel bits recorded in the above sector are formed in a format obtained by converting 8-bit data into 16-bit channel bits by subjecting the same to the 8–16 code modulation.

The header field 11 is an area in which preset data is recorded at the manufacturing time of the optical disk 1. The header field 11 is constructed by a header 1 field, header 2 field, header 3 field, and header 4 field.

Each of the header 1 field to header 4 field is constructed from 46 bytes or 18 bytes and includes a 36-byte or 8-byte sync. code portion VFO (Variable Frequency Oscillator), 3-byte address mark AM (Address Mark), 4-byte address portion PID (Position Identifier), 2-byte error detection code IED (ID Error Detection Code), and 1-byte postamble PA (Postambles).

The header 1 field and header 3 field each include 36-byte sync. code portion VFO1 and the header 2 field and header 4 field each include 8-byte sync. code portion VFO2.

The sync. code portions VFO1, VFO2 are areas used for the pull-in operation of PLL, the sync. code portion VFO1 is formed by recording successive data items of "010 . . . " in channel bits by "36" bytes (576 bits in terms of channel bits) (by recording patterns at preset intervals) and the sync. code portion VFO2 is formed by recording successive data items of "010 . . . " in channel bits by "8" bytes (128 bits in terms of channel bits).

The address mark AM is a sync. code of "3" bytes indicating the position at which the sector address starts. As the pattern of each byte of the address mark AM is formed, a special pattern which does not appear in a data portion of "0100100000000100" is used.

The address portions PID to PID are areas in which sector addresses (containing ID numbers) stored as 4-byte address information are recorded. The sector address is a physical sector number stored as a physical address indicating the physical position on the track, and since the physical sector number is recorded in the mastering step, it is impossible to rewrite the sector number.

The ID number is "1" in the case of PID1, for example, and is a number indicating the number of the time, among the four times, by which the address portion is overwritten in one header portion 11.

The error detection code IED is an error detection code for the sector address (containing the ID number) and can be used to detect the presence or absence of an error in the readout PID.

The postamble PA contains state information necessary for demodulation and has a role for polarity adjustment so as to cause the header portion 11 to terminate in a space.

The mirror field 17 is used for offset compensation for a tracking error signal, timing control of a land/groove switching signal and the like.

The recording field 18 is constructed by a gap field of 10 to 26 bytes, guard 1 field of 20 to 26 bytes, VFO 3 field of 35 bytes, play synchronous code (PS) field of 3 bytes, data field of 2418 bytes, postamble 3 (PA3) field of one byte, guard 2 field of 48 to 55 bytes and buffer field of 9 to 25 bytes.

The gap field is an area in which nothing is written.

The guard 1 field is an area provided for preventing terminal deterioration inherent to the phase changing type recording medium occurring at the time of repetitive recording from influencing the VFO 3 field in any way.

The VFO 3 field is an area for PLL locking and is also used for inserting a sync. code into the same pattern and attaining the synchronization of the byte boundary.

The PS (pre-synchronous code) field is a synchronization area for connection to the data field.

The data field is an area constructed by data ID, data ID error correction code IED (Data ID Error Detection Code), sync. code, ECC (Error Correction Code), EDC (Error Detection Code), user data and the like. The data ID includes sector ID1 to sector ID16 of 4-byte configuration (32 channel bits) of each sector. The data ID error correction code IED is an error correction code of 2-byte configuration (16 bits) for data ID.

The sector ID (1 to 16) is constructed by 1-byte (8-bit) sector information and 3-byte sector number (logical sector number as a logical address indicating the logical position on the track). The sector information is constructed by a 1-bit sector format type field, 1-bit tracking method field, 1-bit reflectance field, 1-bit reserve field, 2-bit area type field, 1-bit data type field and 1-bit layer number field.

The logical sector number is made different from the physical sector number by the slip replacement process as will be described later.

When "1" is recorded in the sector format type field, it indicates a zone format type. When "1" is recorded in the tracking method field, it indicates a groove tracking method. When "1" is recorded in the reflectance field, it indicates that the reflectance is more than 40%. When "00" is recorded in the area type field, it indicates a data area, when "01" is recorded, it indicates a lead-in area, when "10" is recorded, it indicates a lead-out area, and when "11" is recorded, it indicates "reserve". When "0" is recorded in the data type field, it indicates recording of read only data and when "1" is recorded, it indicates recording of rewritable data. When "0" is recorded in the layer number field, it indicates "layer 0".

The PA (postamble) 3 field is an area containing state information necessary for demodulation and indicating the end of the final byte of a preceding data field.

The guard 2 field is an area provided for preventing terminal deterioration inherent to the phase changing type recording medium occurring at the time of repetitive recording from influencing the data field in any way.

The buffer field is an area provided for absorbing fluctuation in the rotating motion of the motor which rotates the optical disk 1 so as to prevent the data field from extending to the next header portion 11.

The reason why the gap field is represented by 10 to 26 bytes is to permit a random shifting operation to be effected. The random shifting operation shifts the starting position of data to be written so as to reduce deterioration in the phase changing type recording medium due to repeated recording operations. The length of the random shifting is adjusted according to the length of the buffer field arranged in the last portion of the data field, and the whole length of one sector is 2697 bytes and is constant.

In the respective zones 3a, . . . , 3x of the data area 3, spare sectors are prepared and each of them is used as a final spare when the slip replacement process (slipping replacement algorithm) in units of one sector is effected in the same zone.

Figure 10:
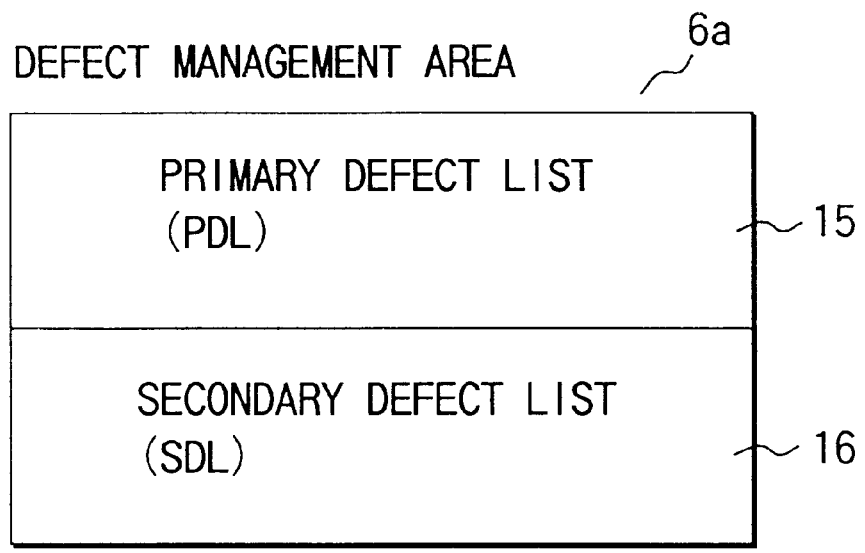
FIG. 10 is a diagram showing a recording example in a defect management area recorded in the rewritable zone of the optical disk of FIG. 2.

As shown in FIG. 10, in the replacement management area 6a of the rewritable data zone 6, a primary defect list (PDL) 15 and secondary defect list (SDL) 16 are to be recorded.

The primary defect list (PDL) 15 is a list of physical sector numbers (physical addresses) of sectors which are determined as defective at the manufacturing time or at the initial time such as the application starting time. The sector numbers indicate sectors to be subjected to the replacement process (slipping replacement algorithm) by the slipping process in units of one sector.

In the primary defect list 15, primary defect list identification data, the number of addresses as the number of defects, and physical sector numbers indicating defective sectors are described.

The secondary defect list (SDL) 16 is a list for ECC blocks (defective blocks) having sectors which are determined as defective at the recording time other than the above initial time. That is, it is a list of the physical sector numbers (physical addresses) of the first or head sectors of ECC blocks (defective blocks) having sectors which are determined as defective when data is recorded for preset ECC blocks and the physical sector numbers (physical addresses) of the first sectors of ECC blocks (replacement blocks: spare blocks) which are used for replacement for the defective blocks.

In the secondary defect list, secondary defect list identification data, the number of entries as the number of defects, physical sector numbers indicating first sectors as the addresses of defective blocks and physical sector numbers indicating the first sectors as the addresses of replacement blocks for the defective blocks are described. The addresses of the defective blocks and the addresses of the replacement blocks for the defective blocks are described in one-to-one correspondence.

In the optical disk device of FIG. 1, the optical disk 1 is rotated at different rotation speeds in the respective zones, for example, by a motor 23. The motor 23 is controlled by a motor control circuit 24.

Recording of data on the optical disk 1 or reproduction of data recorded on the optical disk 1 are effected by an optical head 25. The optical head 25 is fixed on a driving coil 27 forming a movable portion of a linear motor 26, and the driving coil 27 is connected to a linear motor control circuit 28.

A speed detector 29 is connected to the linear motor control circuit 28 and a speed signal of the optical head 25 is supplied to the linear motor control circuit 28.

A permanent magnet (not shown) is disposed on the fixed portion of the linear motor 26 and when the driving coil 27 is excited by the linear motor control circuit 28, the optical head 25 is moved in the radial direction of the optical disk 1.

In the optical head 25, an objective lens 30 is supported by a wire or flat spring (not shown), and the objective lens 30 can be moved in a focusing direction (in the optical axis direction of the lens) by a driving coil 32 and moved in a tracking direction (in a direction perpendicular to the optical axis of the lens) by a driving coil 31.

A semiconductor laser oscillator 39 is driven by a laser control circuit 33 to generate laser light. The laser control circuit 33 corrects the amount of laser light from the semiconductor laser oscillator 39 according to a monitoring current from a monitoring photodiode PD of the semiconductor laser oscillator 39.

The laser control circuit 33 is operated in synchronism with a recording clock signal from a PLL circuit (not shown). The PLL circuit divides the frequency of a basic clock signal from an oscillator (not shown) to generate a recording clock signal.

The laser light generated from the semiconductor laser oscillator 39 driven by the laser control circuit 33 is applied to the optical disk 1 via a collimator lens 40, half-prism 41, and objective lens 30 and the reflection light from the optical disk 1 is directed to a photodetector 44 via the objective lens 30, half-prism 41, condenser lens 42 and cylindrical lens 43.

The photodetector 44 is constructed from four-divided photodetector cells 44a, 44b, 44c, 44d.

An output signal of the photodetector cell 44a of the photodetector 44 is supplied to one input terminal of an adder 46a via an amplifier 45a, an output signal of the photodetector cell 44b is supplied to one input terminal of an adder 46b via an amplifier 45b, an output signal of the photodetector cell 44c is supplied to the other input terminal of the adder 46a via an amplifier 45c, and an output signal of the photodetector cell 44d is supplied to the other input terminal of the adder 46b via an amplifier 45d.

Further, the output signal of the photodetector cell 44a of the photodetector 44 is supplied to the one input terminal of the adder 46d via the amplifier 45a, the output signal of the photodetector cell 44b is supplied to the one input terminal of the adder 46d via the amplifier 45b, the output signal of the photodetector cell 44c is supplied to the input terminal of the adder 46c via the amplifier 45c, and the output signal of the photodetector cell 44d is supplied to the other input terminal of the adder 46c via the amplifier 45d.

An output signal of the adder 46a is supplied to an inverting input terminal of a differential amplifier OP2 and an output signal of the adder 46b is supplied to a non-inverting input terminal of the differential amplifier OP2. Therefore, the differential amplifier OP2 supplies a signal (focusing error signal) relating to the focus point to a focusing control circuit 47 according to a difference between the output signals of the adders 46a and 46b. An output signal of the focusing control circuit 47 is supplied to the focusing driving coil 32 and controlled to cause the laser light to be always exactly focused on the optical disk 1.

An output signal of the adder 46c is supplied to non-inverting input terminal of a differential amplifier OP1 and an output signal of the adder 46d is supplied to an inverting input terminal of the differential amplifier OP1. Therefore, the differential amplifier OP1 supplies a tracking error signal to a tracking control circuit 48 according to a difference between the output signals of the adders 46c and 46d. The tracking control circuit 48 creates a track driving signal according to a tracking error signal supplied from the differential amplifier OP1.

The track driving signal output from the tracking control circuit 48 is supplied to the driving coil 31 for driving the objective lens 30 in the tracking direction. Further, the tracking error signal used in the tracking control circuit 48 is supplied to the linear motor control circuit 28.

A total sum signal of the output signals of the photodetector cells 44a to 44d of the photodetector 44 obtained after the focusing and tracking operations are effected, that is, a signal obtained by adding together the output signals of the adders 46c and 46d in an adder 46e reflects a variation in the reflectance of a pit (recorded data) formed on the track. The signal is supplied to a data reproducing circuit 38 and recorded data is reproduced in the data reproducing circuit 38.

Reproduced data reproduced in the data reproducing circuit 38 is subjected to the error correction process in an error correction circuit 52 by use of an attached error correction code ECC, and the reproduced data is then output to an optical disk control device 56 used as an external device via an interface circuit 55.

Further, while the objective lens 30 is being moved by the tracking control circuit 48, the linear motor control circuit 28 drives the linear motor 26 or the optical head 25 to set the objective lens 30 in or near the central position in the optical head 25.

In the preceding stage of the laser control circuit 33, a data creation circuit 34 is provided. The data creation circuit 34 includes an ECC block data creation circuit (not shown) for converting ECC block format data used as recording data as shown in FIG. 5 and supplied from the error correction circuit 52 into recording ECC block format data having ECC block sync. codes attached thereto as shown in FIG. 6 and a modulation circuit (not shown) for modulating recording data from the ECC block data creation circuit according to the 8–16 code conversion system.

The data creation circuit 34 is supplied with recording data having an error correction code attached thereto by the error correction circuit 52 and dummy data for error checking read out from the memory 10. The error correction circuit 52 is supplied with recording data from the optical disk control device 56 used as an external device via the interface circuit 55 and a bus 49.

The error correction circuit 52 creates ECC block format data as shown in FIG. 5 by attaching error correction codes (ECC, ECC2) for the lateral and longitudinal directions of recording data items, which are set in units of one sector of 2k bytes and included in the 32k-byte recording data supplied from the optical disk control device 56 and attaching sector IDs (logical address numbers), to the respective recording data items.

Further, in the optical disk device, a D/A converter 51 used for transferring information between a CPU 50 for controlling the whole portion of the optical disk device and the focusing control circuit 47, tracking control circuit 48 and linear motor control circuit 28 is provided.

The motor control circuit 24, linear motor control circuit 28, laser control circuit 33, data reproducing circuit 38, focusing control circuit 47, tracking control circuit 48, and error correction circuit 53 are controlled by the CPU 50 via the bus 49, and the CPU 50 performs preset operations according to control programs stored in the memory 10.

The memory 10 is used for storing the control programs and data. The memory 10 includes a table 10a containing speed data items such as rotation speeds for the zones 3a, . . . , 3x and the number of sectors for each track and a table 10b containing the primary defect list (PDL) 15 and secondary defect list (SDL) 16 read out from the replacement management area 6a of the optical disk 1 are recorded.

Figure 11:
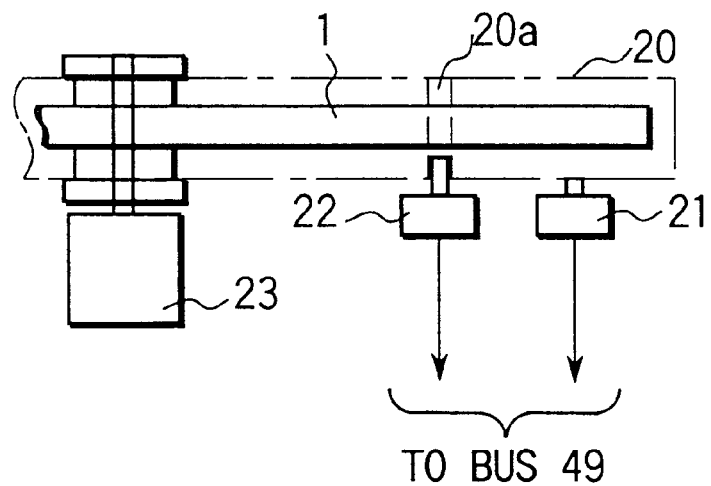
FIG. 11 is a view for illustrating detectors for detecting the presence or absence of the optical disk of FIG. 1 and the open or closed state of a cartridge.

As shown in FIGS. 1 and 11, a detector 21 for detecting the presence or absence of a cartridge 20 into which the optical disk 1 is received and a detector 22 for detecting the presence or absence of a through hole 20a of the cartridge 20 are disposed below the optical disk 1. The detectors 21, 22 are each constructed by a microswitch, for example.

The cartridge 20 is formed to receive the optical disk 1, and if the cartridge 20 is opened at least once (if the optical disk 1 is taken out), the through hole 20a is formed in the cartridge. Detection signals from the detectors 21, 22 are supplied to the CPU 50 via the bus 49.

The CPU 50 detects whether the cartridge 20 is present or not according to the detection signal from the detector 21. Further, when it is determined that the cartridge 20 is present, the CPU 50 detects whether the cartridge 20 has been opened at least once according to the detection signal from the detector 22.

Next, the primary defect list forming process effected at the manufacturing time or the initial time, such as the application starting time, is explained with reference to the flowchart of FIG. 12.

Assuming now that the optical disk 1 at the application starting time is loaded on the optical disk device, then the CPU 50 determines the slip replacement process to read out dummy data from the memory 10 and control the recording operation for each sector of the data area 3 of the optical disk 1 by use of the dummy data (ST1).

Therefore, while the optical disk 1 is being rotated at a rotation speed different for each zone of the data area 3, the laser control circuit 33 is controlled by a signal obtained by modulating the dummy data and the output from the data creation circuit 34 to drive the semiconductor laser oscillator 39 so that laser light corresponding to the modulated signal of the dummy data will be applied to the optical disk 1. As a result, data corresponding to the modulated signal of the dummy data is recorded in the data field of each sector of the data area 3 of the optical disk 1.

After this, when the recording operation for each sector of the data area 3 of the optical disk 1 is terminated, the CPU 50 controls the readout of dummy data for each sector (ST2).

Therefore, while the optical disk 1 is being rotated at a rotation speed different for each zone of the data area 3, reflection light based on the reproducing laser light from the semiconductor laser oscillator 39 is directed to the photo-detector 44 so that the physical sector number recorded in the header portion 11 of each sector can be reproduced by the data reproducing circuit 38 and data recorded in the data field of the sector can be demodulated and reproduced.

Based on the above reproduction, the CPU 50 determines that data is correctly recorded when the physical sector number of the header portion 11 of each sector can be correctly reproduced. Correctly recorded data is determined by the CPU 50 also when the recorded dummy data is compared with the reproduced data and the number of errors in the sector does not exceed a first specified value. The CPU 50 determines the occurrence of a primary defect (initial defect) caused by incorrectly recorded data, thereby making it an object of the slip replacement process, when the physical sector number in the header portion 11 cannot be correctly reproduced or when the number of errors in the sector exceeds the first specified value (ST3).

The first specified value is determined such that the number of rows containing, for example, four or more error bytes in one sector having a configuration of 182 bytes×13 rows is set to five or more.

As a result of the above determination, if the CPU 50 determines that the defect should be an object of the slip replacement process, the CPU classifies the sector as a defective sector and stores the physical sector number thereof as a defective sector into the memory 10 (ST4).

Then, when the process for checking all of the sectors in the data area 3 is completed (ST5), the CPU 50 controls the recording operation for the replacement management area 6a of the optical disk 1 according to data dealt with as a primary defect list containing primary defect list identification information and the number of physical sector numbers attached to the physical sector numbers of the defective sectors stored in the memory 10 (ST6).

Therefore, while the optical disk 1 is being rotated at a rotation speed corresponding to the rewritable zone 6, the laser control circuit 33 is controlled by a signal obtained by modulating data supplied as the primary defect list from the data creation circuit 34 to drive the semiconductor laser oscillator 39 so that laser light corresponding to the modulated signal of data as the primary defect list will be applied to the optical disk 1. As a result, data corresponding to the modulated signal of data dealt with as the primary defect list is recorded in the replacement management zone 6a of the data area 3 of the optical disk 1.

Next, the slip replacement process (slipping replacement algorithm) which is effected in units of one sector based on the primary defect list, is explained with reference to FIGS. 13, 14, 15.

That is, when data is recorded in units of one ECC block on the optical disk 1, the slip replacement process in units of one sector is effected by slipping or skipping over the defective sector based on the primary defect list.

For example, assuming now that data of one ECC block is recorded by use of 16 sectors ranging from the physical sector number (m−1) to the physical sector number (m+14) of the optical disk 1, then the data of one ECC block is recorded using 16 sectors ranging from the physical sector number (m−1) to the physical sector number (m+15) excluding the sector of the physical sector number m if the sector of the physical sector number m in the above sectors is registered in the primary defect list.

Figure 14:
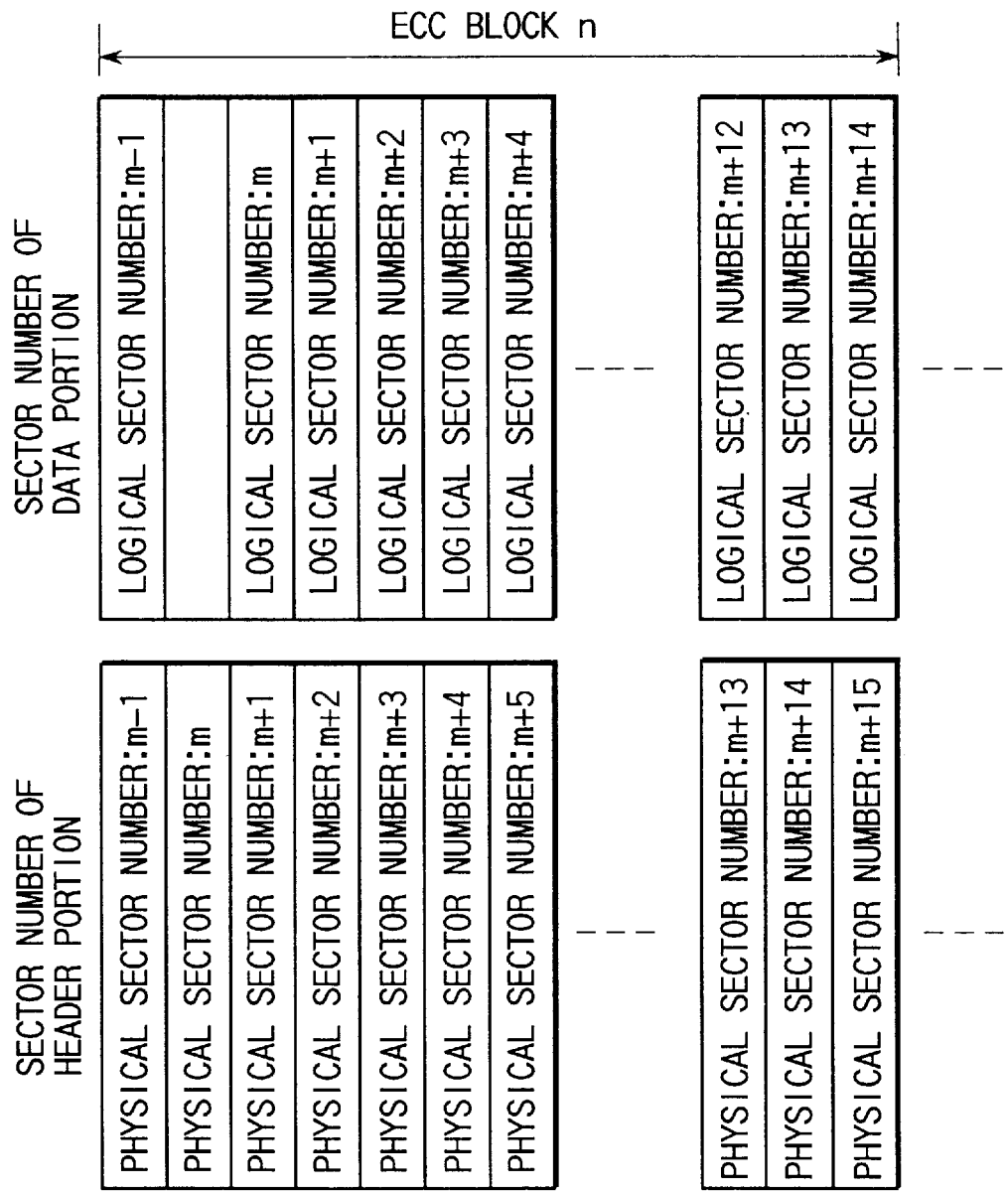

In this case, if "m−1" is attached as the logical sector number for the physical sector number (m−1) as shown in FIGS. 13 and 14, the logical sector number m is recorded for the physical sector number (m+1), the logical sector number (m+1) is recorded for the physical sector number (m+2), the logical sector number (m+2) is recorded for the physical sector number (m+3), the logical sector number (m+3) is recorded for the physical sector number (m+4), the logical sector number (m+4) is recorded for the physical sector number (m+5), the logical sector number (m+5) is recorded for the physical sector number (m+6), the logical sector number (m+6) is recorded for the physical sector number (m+7), the logical sector number (m+7) is recorded for the physical sector number (m+8), the logical sector number (m+8) is recorded for the physical sector number (m+9), the logical sector number (m+9) is recorded for the physical sector number (m+10), the logical sector number (m+10) is recorded for the physical sector number (m+11), the logical sector number (m+11) is recorded for the physical sector number (m+12), the logical sector number (m+12) is recorded for the physical sector number (m+13), the logical sector number (m+13) is recorded for the physical sector number (m+14), and the logical sector number (m+14) is recorded for the physical sector number (m+15).

Figure 15:
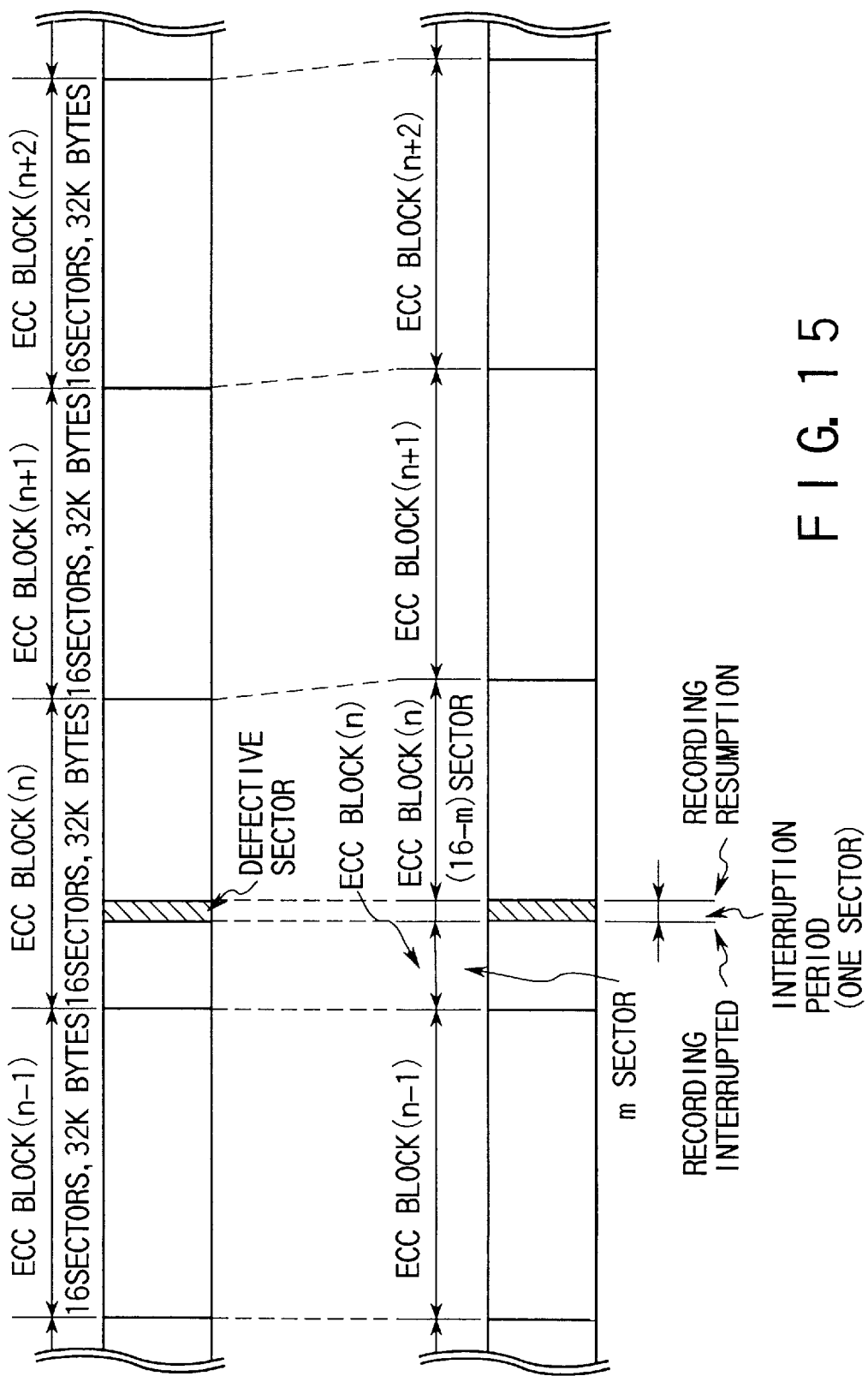
FIG. 15 is a diagram for illustrating the slip replacement process effected in units of one sector when successive data items such as moving pictures are recorded on a plurality of ECC blocks.

Therefore, as shown in FIG. 15, if the slip replacement process in units of one sector is effected in the ECC block n in the ECC blocks (n−1), n, (n+1), (n+2), . . . , in which successive data items, such as moving pictures, are recorded, the recording operation only for the defective sector contained in the ECC block n is interrupted and the relation between the physical sector and the ECC block (logical sector) in which data is recorded is shifted by one sector.

As a result, if successive data items such as moving pictures and speeches are recorded in the above ECC block, interruption of the reproduction due to the presence of the defective sector occurs, but since the period of interruption of the reproduction for one sector is short, no substantial influence will be given to the reproduced pictures and speeches.

It is understood that the period of interruption of one sector is relatively short in comparison with a case wherein the recording operation is interrupted for a period of one ECC block if the slip replacement process is effected in units of one ECC block as in the prior art. Thus, successive data items can be recorded almost without interruption.

Since the slip replacement process in units of one sector is effected based on the primary defect list, physical sectors for each ECC block are allocated and the relation of the physical sectors with respect to the logical sectors for each ECC block is determined and stored in the memory 10 when the optical disk 1 is loaded on the optical disk device and the primary defect list read out from the replacement management area 6a of the optical disk 1 is recorded in the table 10b of the memory 10.

Next, the linear replacement process (linear replacement algorithm) in units of one ECC block is explained with reference to FIGS. 16, 17 and 18.

For example, assume now that successive data items such as moving pictures or speeches are recorded in the ECC blocks which are successively placed on the optical disk 1 or in the ECC block (n−1), ECC block (n), ECC block (n+1), ECC block (n+2), . . . as shown in FIG. 16.

If it is determined that a secondary-defect occurs in one of the sectors of the ECC block (n) at the actual data recording time, the ECC block (n) containing the secondary defective sector is replaced using a replacement ECC block (1) by the linear replacement process in units of one block and then corresponding data is recorded therein. At this time, data indicating that the linear replacement process has been effected is recorded in the memory 10. The order of reproduction of the thus recorded data items is set such that the ECC block (n−1) is first reproduced, then the ECC block (1) for replacement is reproduced, the ECC block (n+1) is reproduced next, and the ECC block (n+2) is reproduced as shown in FIG. 17.

In this case, unlike in the conventional case, it is not necessary to effect the replacement process in units of one sector, that is, it is not necessary to access the ECC block for replacement in the course of reproduction of one ECC block, then return to the original ECC block and continue the reproducing operation for the original ECC block. Thus the reproduction speed can be sufficiently high so as not to cause any harmful influence during the replacement process.

In a case where the replacement process in units of one ECC block is effected and if the logical sector numbers m to (m+15) and the physical sector numbers m to (m+15) of the sectors in the ECC block (n) containing the secondary defective sector are obtained before the linear replacement process as shown in FIG. 18, then the logical sector numbers m to (m+15) are attached to the physical sector numbers y to (y+15) of the sectors in the replacement ECC block (1) after completion of the linear replacement process.

In other words, the logical sector number of the recording field 18 to be replaced is recorded as the address data of the replacing recording field 18, and this recording operation is performed without reference to the address data (physical sector number) stored in the replacing header field 11.

Figure 20:
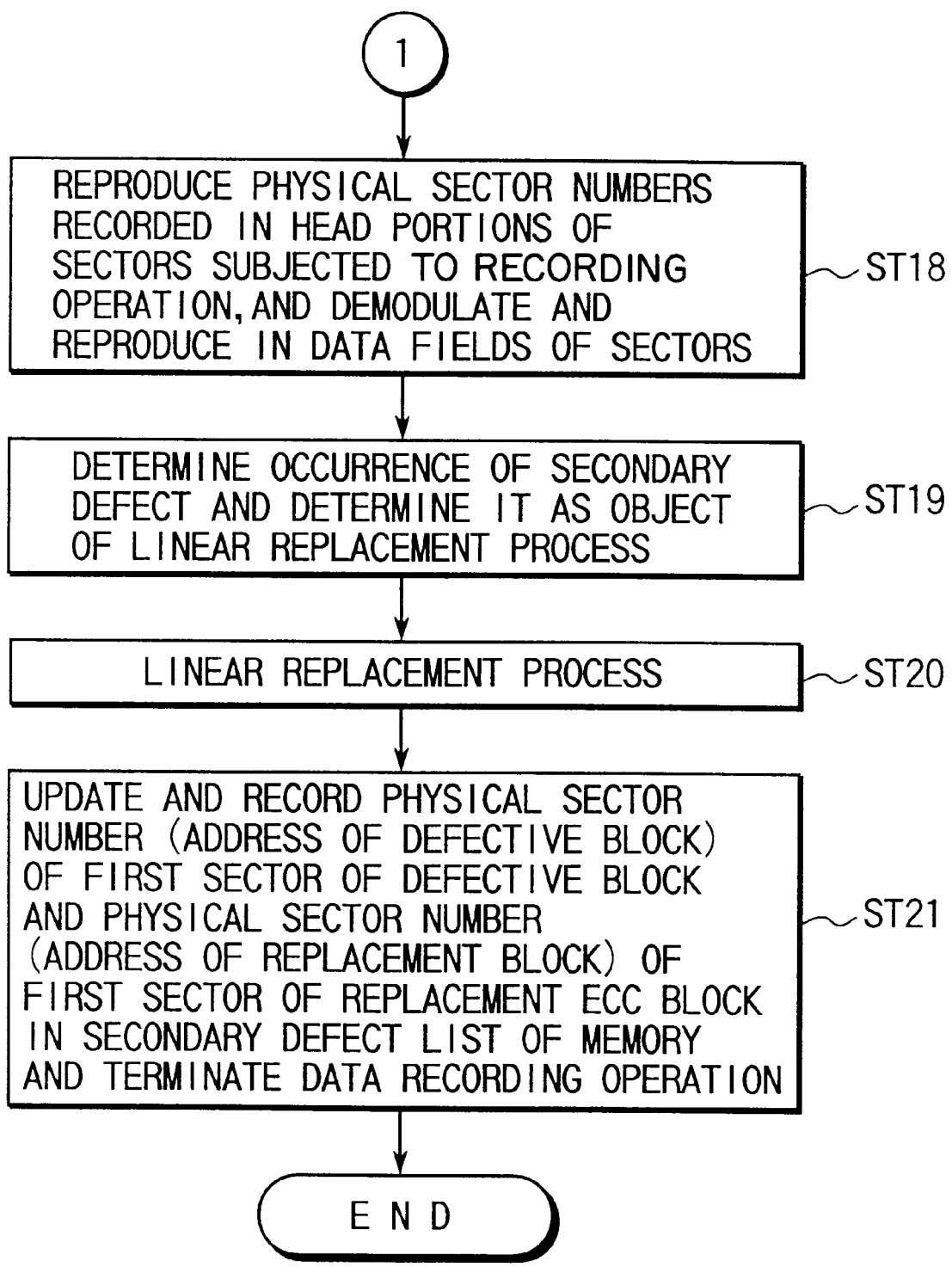

Next, the process effected when data is recorded into a preset ECC block is explained with reference to the flowcharts shown in FIGS. 19 and 20.

For example, assume now that recording data and a specification for recording of data into the preset ECC block in the data area 3 of the optical disk 1 are supplied from the optical disk control device 56 to the optical disk device via the interface circuit 55. Then, the specification for recording of data into the preset ECC block is supplied to the CPU 50, and the recording data of a sector unit obtained by attaching an error correction code to the above recording data by the error correction circuit 52 is supplied to the data creation circuit 34 (ST10).

At the time of loading of the optical disk 1, the CPU 50 reads out the primary defect list and secondary defect list recorded in the replacement management area 6a of the optical disk 1, records them in the table 10b of the memory 10, and determines and records physical sector numbers (the primary defective sector is already slipped over) of the respective sectors for the ECC block based on the primary defect list (ST11).

Further, the CPU 50 rotates the optical disk 1 at a rotation speed corresponding to the zone in which the ECC block to be recorded is contained (ST12).

In this state, when the physical sector number of the first sector of the ECC block is obtained by reproduction of the head portion 11, the data creation circuit 34 converts ECC block format data (first one sector) used as recording data into format data of recording ECC block to which sync. codes for the ECC block are attached, subject the same to the 8–16 code modulation and then outputs the resultant data to the laser control circuit 33. The semiconductor laser oscillator 39 is driven by the laser control circuit 33 to apply laser light corresponding to the modulated signal of ECC block format data to the optical disk 1. As a result, data is recorded in the first sector of the preset ECC block of the data area 3 of the optical disk 1 (ST13).

After this, sector unit data is recorded in the same manner as described above (ST13) each time a physical sector number corresponding to the physical sector number specified by the CPU 50 is reproduced.

At this time, data is recorded based on the physical sector numbers of the sectors for the ECC block based on the primary defect list recorded in the memory 10. That is, data is recorded while effecting the above-described slip replacement process to slip or skip over the defective sector.

When recording of data into the preset ECC block is completed, the CPU 50 determines the presence or absence (loaded state or not) of the cartridge 20 according to a detection signal from the detector 21 (ST14), and if the presence of the cartridge 20 is determined, the CPU 50 determines whether the cartridge 20 has been opened at least once according to a detection signal from the detector 22 (ST15).

Based on the result of the above determination, if the cartridge being loaded has not been opened even once, the CPU 50 determines that it is not necessary to check the recording data and completes the data recording process (ST16).

If the loading of the cartridge 20 is not determined in the step ST14 or if the loading of the cartridge 20 is determined and it is determined that the cartridge 20 has been opened at least once, the CPU 50 controls the data readout for each sector of the ECC block (ST17).

As a result, reflection light based on laser light for reproduction from the semiconductor laser oscillator 39 is directed to the photodetector 44 and the data reproducing circuit 38 reproduces the physical sector numbers recorded in the header portions 11 of the sectors subjected to the above recording operation and demodulates and reproduces data recorded in the data fields of the respective sectors (ST18).

Based on the above reproduction, the CPU 50 determines that data is correctly recorded when the physical sector number of the header portion 11 of each sector can be correctly reproduced or when the recorded data of each sector is compared with the reproduced data of each sector and it is determined that the number of errors in the sector does not exceed a preset specified value. The CPU 50 further determines occurrence of the secondary defect due to the fact that data is not correctly recorded and determines it as an object of the linear replacement process when the physical sector number in the header portion 11 cannot be correctly reproduced or the number of errors in the sector exceeds the preset specified value (ST19).

For detecting an error state in the sector, one of the following four conditions is used.

The first condition is that the physical sector number in the header portion 11 cannot be correctly reproduced.

The second condition is that the number of errors in at least one sector exceeds a first specified value.

The third condition is that the number of errors in at least one sector does not exceed the first specified value but exceeds a second specified value and the number of errors in the whole ECC block exceeds a third specified value.

The fourth condition is that the number of errors in at least one sector does not exceed the first specified value but exceeds the second specified value and the number of errors in the sectors of the whole ECC block exceeds a fourth specified value.

The reason why the third and fourth conditions are set as an object of the linear replacement process is that data can be corrected in the whole ECC block even when a large number of errors occur and if they occur only in one sector in the ECC block. The ECC block has 208 rows as a whole and data of up to 16 rows, each including five or more errors, can be corrected. Under this condition, the above specified values are determined.

That is, the first specified value is determined such that the number of rows containing, for example, four or more error bytes in one sector having a configuration of 182 bytes×13 rows is set to five or more.

The second specified value is determined such that the number of rows containing four or more error bytes is set to three or more.

The third specified value is determined such that the number of rows containing four or more error bytes is set to ten or more.

The fourth specified value is set to 2 sectors.

As the result of determination in the step ST19, an object of the linear replacement process is determined, an ECC block determined as an object is treated as a defective block and the above-described linear replacement process for recording data of ECC block unit, which is to be recorded in the defective block, into a replacement ECC block is effected (ST20). If an object of the linear replacement process is not determined, the recording process for the data is completed.

If the above linear replacement process is effected, the CPU 50 updates and records the physical sector number (address of the defective block) of the first sector of the defective block and the physical sector number (address of the replacement block) of the first sector of the replacement ECC block on the secondary defect list of the memory 10 and terminates the recording process for the data (ST21).

Further, when the optical disk 1 subjected to the linear replacement process is taken out from the optical disk device or when the secondary defect list recorded on the table 10b is updated, the CPU 50 updates and records the recording content of the secondary defect list of the memory 10 in the replacement management area 6a of the optical disk 1.

As described above, in the optical disk on which data is recorded in units of one ECC block constructed by 16 sectors, dummy data is recorded at the manufacturing time or at the initial time, such as the application starting time, and the dummy data is reproduced to determine a sector with a primary defect, the address of the sector with the primary defect is recorded on the optical disk, and data of ECC block unit is recorded at the data recording time while skipping over the sector with the primary defect.

As a result, if successive data items, such as moving pictures or speeches, are recorded in the above ECC block, data reproduction is temporarily interrupted because of the presence of the defective sector, but since the interrupting time of the reproduction for one sector is short, the pictures or speeches to be reproduced will not be influenced.

It is understood that the above interruption time is relatively shorter in comparison with recording interruption time of one ECC block caused when the slip replacement process is effected in units of one ECC block as in the prior art. Thus, successive data items can be recorded almost without interruption.

Further, in the optical disk on which data is recorded in units of one ECC block, data is recorded at the data recording time other than the initial time, the data is reproduced to determine the presence of an ECC block having a sector with a secondary defect, and data in the ECC block having the sector with the secondary defect is recorded in an ECC block which is separately prepared.

Thus, even when the defect replacement process is effected at the recording time after the initial time, a lowering in the reproduction speed can be suppressed.

That is, unlike the conventional case, it is not necessary to effect the replacement process in units of one sector; that is, it is not necessary to access the ECC block for replacement in the course of reproduction of one ECC block, then return to the original ECC block and continue the reproducing operation for the original ECC block, and thus the reproduction speed can be sufficiently high so as not to cause any harmful influence from the replacement process.

Additional advantages and modifications will readily occur to those skilled in the art. Therefore, the invention in its broader aspects is not limited to the specific details, and representative embodiments shown and described herein. Accordingly, various modifications may be made without departing from the spirit or scope of the general inventive concept as defined by the appended claims and their equivalents.

I claim:

1. A replacement processing method comprising the acts of:

a) producing format data of an ECC block comprising (i) a first predetermined number of sectors, each of the sectors comprising a second predetermined number of rows, each of the rows having a third predetermined number of bytes, (ii) a plurality of lateral error correction codes, each of the lateral error correction codes comprising a plurality of rows, a number of the rows being equal to a number of the rows of each of the sectors, each of the rows of the lateral error correction codes having a fourth predetermined number of bytes, each of the lateral error correction codes being laterally attached to one of the sectors, respectively, and (iii) a vertical error correction code being vertically attached to the sectors, the vertical error correction code comprising a fifth predetermined number of rows, the fifth predetermined number being equal to the first predetermined number, each of the rows of the vertical error correction code having a sixth predetermined number of bytes, the sixth predetermined number being obtained by adding the third predetermined number and the fourth predetermined number, the ECC block comprising ECC rows, a number of the ECC rows being obtained by adding a number of the rows of the vertical error correction code and a number obtained by multiplying a number of the rows of each of the lateral error correction codes by the number of the rows of the vertical error correction code, each of the ECC rows having the sixth predetermined number of bytes, the format data being used as a unit when recording and reproducing;

b) completing recording of the format data of the ECC block by recording sector data, respectively, in data areas of sector areas of an information recording medium, a number of the sector data and a number of the sector areas being equal to the first predetermined number, the sector data comprising (i) the sectors, (ii) the lateral error correction codes laterally attached to the sectors, and (iii) the rows of the vertical error correction code, each being attached to a last one of the rows of each of the sectors, the information recording medium comprising concentric or spiral tracks for recording data, the tracks including a plurality of the sector areas, each of the sector areas having a predetermined track length, each of the sector areas comprising one header area and one data area, the header area of each of the sector areas being provided such that address data indicating a position of each of the sector areas on the tracks is recorded in advance in the header area, the data area of each of the sector areas being provided such that the data area is continuous with the header area and predetermined data is recorded in the data area;

c) determining, before the act b) whether or not the address data recorded in each of the header areas is reproduced;

d) determining, before the act b), whether or not an error occurs in each of the ECC rows, including an associated one of the rows of the lateral error correction code, and being reproduced from an associated one of the data areas, and determining a number of errors in each of the ECC rows, thereby determining whether or not a number of the ECC rows having a number of error bytes exceeding a seventh predetermined number is larger than an eighth predetermined number; and e) detecting, during the act b), whether at least one of the sector areas has a defect, based on results of the acts c) and e), and performing, when detecting that the at last one of the sector areas has the defect, slipping replacement recording for recording an associated sector data piece of the sector data on one of the sector areas following the at least one of the sector areas, instead of on the at least one of the sector areas, and successively recording other sector data pieces of the sector data on other ones of the sector areas, thereby completing recording of the format data of the ECC block.

2. A replacement processing method comprising the acts of:

a) producing format data of an ECC block comprising (i) 16 sectors, each of the sectors comprising 12 rows, each of the rows having 172 bytes, (ii) a plurality of lateral error correction codes, each of the lateral error correction codes comprising 12 rows, each of the rows of the lateral error correction codes having 10 bytes, each of the lateral error correction codes being laterally attached to one of the 16 sectors, respectively, and (iii) a vertical error correction code comprising 16 rows, each of the rows of the vertical error correction code having 182 bytes, the vertical error correction code being vertically attached to the 16 sectors, the ECC block comprising 208 ECC rows, each of the ECC rows having 182 bytes, the format data being used as a unit when recording and reproducing;

b) completing recording of the format data of the ECC block by recording 16 sector data, respectively, in data areas of 16 sector areas of an information recording medium, the 16 sector data respectively comprising (i) the 16 sectors, (ii) the lateral error correction codes being laterally attached to the sectors, and (iii) the rows of the vertical error correction codes, each of the rows of the vertical error correction code being attached to a last one of the 12 rows of each of the 16 sectors, the information recording medium comprising concentric or spiral tracks for recording data, the tracks including a plurality of sector areas, each of the sector areas having a predetermined track length, each of the sector areas comprising one header area and one data area, the header area of said each of the sector areas being provided such that address data indicating a position of each of the sector areas on the tracks is recorded in advance in the header area, the data area of each of the sector areas being provided such that the data area is continuous with the header area and predetermined data is recorded in the data area;

c) determining, before the act b), whether or not the address data recorded in each of the header areas is reproduced;

d) determining, before the act b), whether or not an error occurs in each of the ECC rows, the ECC rows including an associated one of the rows of the lateral error correction code, and which is reproduced from an associated one of the data areas, including an associated one of the sectors, and determining a number of errors in each of the ECC rows, thereby determining whether or not a number of the ECC rows having a number of error bytes exceeding a first predetermined number is larger than a second predetermined number;

e) detecting, during execution of the act b), whether at least one of the sector areas has a defect, based on results of the acts c) and e), and performing, when detecting that the at least one of the sector areas has the defect, slipping replacement recording for recording an associated sector data piece of the sector data on one of the sector areas following the at least one of the sector areas, instead of on the at least one of the sector areas, and successively recording other sector data pieces of the sector data on other ones of the sector areas, thereby completing recording of the format data of the ECC block.

3. A replacement processing method comprising the acts of:

a) producing format data of an ECC block comprising (i) a first predetermined number of sectors, each of the sectors comprising a second predetermined number of rows, each of the rows having a third predetermined number of bytes, (ii) a plurality of lateral error correction codes, each of the lateral error correction codes comprising a plurality of rows, a number of the rows of the lateral error correction codes being equal to a number of the rows of each of the sectors, each of the rows of the lateral error correction codes having a fourth predetermined number of bytes, each of the lateral error correction codes being laterally attached to one of the sectors, respectively, and (iii) a vertical error correction code being vertically attached to the sectors, the vertical error correction code comprising a fifth predetermined number of rows, the fifth predetermined number being equal to the first predetermined number, each of the rows of the vertical error correction code having a sixth predetermined number of bytes, the sixth predetermined number of bytes being obtained by adding the third predetermined number and the fourth predetermined number, the ECC block comprising ECC rows, a number of the ECC rows being obtained by adding a number of the rows of the vertical error correction code and a number obtained by multiplying a number of the rows of each of the lateral error correction codes by the number of the rows of the vertical error correction code, each of the ECC rows having the sixth predetermined number of bytes, the format data being used as a unit when recording and reproducing;

b) completing recording of the format data of the ECC block by recording sector data, respectively, in data areas of sectors areas of an information recording medium, the number of the sector data and the number of the sector areas being equal to the number of the sectors, the sector data comprising (i) the sectors, (ii) the lateral error correction codes laterally attached to the sectors, and (iii) the rows of the vertical error correction code, each being attached to a last one of the rows of each of the sectors, the information recording medium comprising (i) concentric or spiral tracks for recording data, the tracks including a plurality of the sector areas, each of the sector areas having a predetermined track length, and (ii) a defect management data area, each of the sector areas comprising one header area and one data area, the header area of each of the sector areas being provided such that address data indicating a position of each of the sector areas on the tracks is recorded in advance in the header area, the data area of each of the sector areas being provided such that the data area is continuous with the header area and predetermined data is recorded in the data area;

c) recording the address data, before the act b), indicating a position of at least one of the sector areas which is determined to be a defective sector area, in advance in the defect management data area;

d) determining whether or not each of the sector areas is a defective sector area, based on the address data recorded in the defect management data area; and e) performing, during the act b), linear replacement recording for recording an associated sector data piece of the sector data on one of the sector areas following the sector area thereof determined to be the defective sector area during the act d), instead of on the sector area determined to be the defective sector area, and successively recording other sector data pieces of the sector data on other ones of the sector areas, thereby completing recording of the format data of the ECC block.

4. A replacement processing method comprising the acts of:

a) producing format data of an ECC block comprising (i) a first predetermined number of sectors, each of the sectors comprising a second predetermined number of rows, each of the rows having a third predetermined number of bytes, (ii) a plurality of lateral error correction codes, each of the lateral error correction codes comprising a plurality of rows, a number of the rows of the lateral error correction codes being equal to the number of the rows of each of the sectors, each of the rows of the lateral error correction codes having a fourth predetermined number of bytes, each of the lateral error correction codes being laterally attached to one of the sectors, respectively, and (iii) a vertical error correction code being vertically attached to the sectors, the vertical error correction code comprising a fifth predetermined number of rows, the fifth predetermined number being equal to the first predetermined number, each of the rows of the vertical error correction code having a sixth predetermined number of bytes, the sixth predetermined number of bytes being obtained by adding the third predetermined number and the fourth predetermined number, the ECC bloc comprising ECC rows, a number of the ECC rows being obtained by adding a number of the rows of the vertical error correction code and a number obtained by multiplying a number of the rows of each of the lateral error correction codes by the number of the rows of the vertical error correction codes, each of the ECC rows data being used as a unit when recording and reproducing;

b) completing recording of the format data of the ECC block by recording sector data, respectively, in data areas of sector areas of an information recording medium, the number of the sector data and the number of the sector areas being equal to the first predetermined number, the sector data comprising (i) the sectors, (ii) the lateral error correction codes laterally attached to the sectors, and (iii) the rows of the vertical error correction codes, each being attached to a last one of the rows of each of the sectors, the information recording medium comprising (i) concentric or spiral tracks for recording data, the tracks including a plurality of the sector areas, each of the sector areas having a predetermined track length, and (ii) a defect management data area, each of the sector areas comprising one header area and one data area, the header area of each of the sector areas being provided such that address data indicating a position of each of the sector areas on the tracks is recorded in advance in the header area, the data area of each of the sector areas being provided such that the data area is continuous with the header area and predetermined data is recorded in the data area;

c) determining, before the act b), whether or not the address data recorded in each of the header areas is reproduced;

d) determining, before the act b), whether or not an error occurs in each of the ECC rows, including an associated one of the rows of the lateral error correction code, and being reproduced from an associated one of the data areas and determining a number of errors in each of the ECC rows, thereby determining whether or not a number of the ECC rows having a number of error bytes exceeding a seventh predetermined number is larger than an eighth predetermined number;

e) detecting, before the act b), whether or not at least one of the sector areas has a defect, based on results of the acts c) and d), and recording, when detecting that the at least one of the sector areas has the defect, the address data indicating the position of the at least one of the sector areas in the defect management data area; and f) performing, during the act b), slipping replacement recording for recording an associated sector data piece of the sector data on one of the sector areas following the at least one of the sector areas, instead of on the at least one of the sector areas, recording the position of the at least one of the sector areas indicated by the address data in the defect management data area, and successively recording other sector data pieces of the sector data on other ones of the sector areas, thereby completing recording of the format data of the ECC block.

5. A replacement processing method comprising the acts of:

a) producing format data of an ECC block comprising (i) a first predetermined number of sectors, each of the sectors comprising a second predetermined number of rows, each of the rows having a third predetermined number of bytes, (ii) a plurality of error correction codes, each of the lateral error comprising a plurality of rows, a number of the rows of the lateral error correction codes being equal to the number of the rows of each of the sectors, each of the rows of the lateral error correction codes having a fourth predetermined number of bytes, each of the lateral error correction codes being laterally attached to one of the sectors, respectively, and (iii) a vertical error correction code being vertically attached to the sectors, the vertical error correction code comprising a fifth predetermined number of rows, the fifth predetermined number being equal to the first predetermined number, each of the rows of the vertical error correction code having a sixth predetermined number of bytes, the sixth predetermined number being obtained by adding the third predetermined number and the fourth predetermined number, the ECC block comprising ECC rows, a number of the ECC rows being obtained by adding a number of the rows of the vertical error correction code and a number obtained by multiplying a number of the rows of each of the lateral error correction codes by the number of the rows of the vertical error correction code, each of the ECC rows having the sixth predetermined number of bytes, the format data being used as a unit when recording and reproducing;

b) completing recording of the format data of the ECC block by recording sector data, respectively, in data areas of sector areas of a recording area of an information recording medium, the number of the sector data and the number of the sector areas being equal to the first predetermined number, the sector data comprising (i) the sectors, (ii) the lateral error correction codes laterally attached to the sectors, and (iii) the rows of the vertical error correction code, each being attached to a last one of the rows of each of the sectors, the information recording medium comprising (i) concentric or spiral tracks for recording data, the tracks including a plurality of the sector areas, each of the sector areas having a predetermined track length, and (ii) a defect management data area, each of the sector areas comprising one header area and one data area, the header area of each of the sector areas being provided such that address data indicating a position of each of the sector areas on the tracks is recorded in advance in the header area, the data area of each of the sector areas being provided such that the data area is continuous with the header area and predetermined data is recorded in the data area;

c) determining, before the act b), whether or not the address data recorded in each of the header areas is reproduced;

d) determining, before the act b), whether or not an error occurs in each of the ECC rows, including an associated one of the rows of the lateral error correction code, and being reproduced from an associated one of the data areas and determining a number of errors in each of the ECC rows, thereby determining whether or not a number of the ECC rows having a number of error bytes exceeding a seventh predetermined number is larger than an eighth predetermined number;

e) detecting, before the act b), whether a number the ECC rows having a number of error bytes exceeding the seventh predetermined number is larger than the eighth predetermined number, by checking the format data of the ECC block, the ECC block comprising the first predetermined number of the sectors of the ECC block reproduced from the data areas;

f) detecting, during the act b), whether an error occurred in at least one of the sector areas, based on results of the acts c) and d) and performing slipping replacement recording for recording an associated sector data piece of the sector data on one of the sector areas following the at least one of the sector areas, and successively recording other sector data pieces of the sector data on other ones of the sector areas, thereby completing recording of the format data of the ECC block; and g) detecting, during the act b), whether at least another one of the sector areas has a defect based on results of the acts c) through e), and performing linear replacement recording for recording the sector data on a replacement block area instead of on the ECC block, the ECC block comprising the sector areas including the at least another one of the sector areas, thereby completing recording of the format data.

6. A replacement processing method comprising the acts of:

a) producing format data of an ECC block comprising (i) 16 sectors, each of the sectors comprising 12 rows, each of the rows having 172 bytes, (ii) a plurality of lateral error correction codes, each of the lateral error correction codes comprising 12 rows, each of the rows of the lateral error correction codes having 10 bytes, and each of the lateral error correction codes being laterally attached to one of the 16 sectors, respectively, and (iii) a vertical error correction code comprising 16 rows, each of the rows of the vertical error correction code having 182 bytes, the vertical error correction code being vertically attached to the 16 sectors, the ECC block comprising 208 ECC rows, each of the ECC rows having 182 bytes, the format data being used as a unit when recording and reproducing;

b) completing recording of the format data of the ECC block by recording 16 sector data, respectively, in data areas of 16 sector areas of a recording area of an information recording medium, the 16 sector data, respectively, comprising (i) the 16 sectors, (ii) the lateral error correction codes laterally attached to the sectors, and (iii) the rows of the vertical error correction codes, each being attached to a last one of the 12 rows of each of the 16 sectors, the information recording medium comprising (i) concentric or spiral tracks for recording data, including the 16 sector areas each having a predetermined track length, (ii) the recording area comprising part of the 16 sector areas, and (iii) a replacement block area comprising another part of the 16 sector areas, each of the sector areas comprising one header area and one data area, the header area of each of the sector areas being provided such that address data indicating a position of each of the sector areas on the tracks is recorded in advance in the header area, the data area of each of the sector areas being provided such that the data area is continuous with the header area and predetermined data is recorded in the data area;

c) determining, before the act b), whether or not the address data recorded in each of the header areas is reproduced;

d) determining, before the act b), whether or not an error occurs in each of the ECC rows, including an associated one of the rows of the lateral error correction code, and which is reproduced from an associated one of the data areas including an associated one of the sectors, and determining a number of errors in each of the ECC rows, thereby determining whether or not a number of the ECC rows having a number of error bytes exceeding a first predetermined number is larger than a second predetermined number;

e) detecting, before the act b), whether a number of the ECC rows having a number of error bytes exceeding the first predetermined number is larger than the second predetermined number, by checking the format data of the ECC block comprising the 16 sectors of the ECC block reproduced from the data areas;

f) detecting, during the act b), whether at least one of the sector areas has a defect based on results of the acts c) and d), and performing slipping replacement recording for recording an associated sector data piece of the sector data on one of the sector areas following said at least one of the sector areas, and successively recording other sector data pieces of the sector data on other ones of the sector areas, thereby completing recording of the format data of the ECC block; and g) detecting, during the act b), whether at least one of the sector areas has the defect based on results of the act c) through the act e), and performing linear replacement recording for recording the sector data on the replacement block area instead of on the ECC block, the ECC block comprising the 16 sector areas including the at least one of the sector areas, thereby completing of recording the format data.

7. A replacement processing method comprising the acts of:

a) producing format data of an ECC block comprising (i) a first predetermined number of sectors, each of the sectors comprising a second predetermined number of rows, each of the rows having a third predetermined number of bytes, (ii) a plurality of lateral error correction codes, each of the lateral error correction codes comprising a number of rows being equal to a number of the rows of each of the sectors, each of the rows of the lateral error correction codes having a fourth predetermined number of bytes, each of the lateral error correction codes being laterally attached to one of the sectors, respectively, and (iii) a vertical error correction code being vertically attached to the sectors, and comprising a fifth predetermined number of rows, the fifth predetermined number being equal to the first predetermined number, each of the rows of the vertical error correction code having a sixth predetermined number of bytes, the sixth predetermined number being obtained by adding the third predetermined number and the fourth predetermined number, the ECC block comprising ECC rows, a number of the ECC rows being obtained by adding a number of the rows of the vertical error correction code and a number obtained by multiplying a number of the rows of each of the lateral error correction codes by the number of the rows of the vertical error correction code, each of the ECC rows having the sixth predetermined number of bytes, the format data being used as a unit when recording and reproducing;

b) completing recording of the format data of the ECC block by recording sector data, respectively, in data areas of sector areas of a recording area of an information recording medium, the number of the sector data and the number of the sector areas being equal to the first predetermined number, the sector data respectively comprising (i) the sectors, (ii) the lateral error correction codes laterally attached to the sectors, and (iii) the rows of the vertical error correction code each being attached to a last one of the rows of each of the sectors, the information recording medium comprising (i) concentric or spiral tracks for recording data, the tracks including a plurality of the sector areas, each of the sector areas having a predetermined track length, (ii) the recording area comprising part of the plurality of sector areas, (iii) a replacement block area comprising another part of the plurality of sector areas, and (iv) a defect management data area, each of the sector areas comprising one header area and one data area, the header area of each of the sector areas being provided such that address data indicating a position of each of the sector areas on the tracks is recorded in advance in the header area, the data area of each of the sector areas being provided such that the data area is continuous with the header area and predetermined data is recorded in the data area;

c) recording, before the act b), the address data, indicating a position of at least one of the sector areas determined to be a defective sector area, in advance in the defect management data are;

d) determining whether or not each of the sector areas has a defect, based on the address data recorded in the defect management data area;

e) performing, during the act b), slipping replacement recording for recording an associated sector data piece or pieces of the sector data on one or ones of the sector areas following the sector area or the sector areas determined to have the defect during the act d), and successively recording other sector data pieces of the sector data on other ones of the sector areas, thereby completing recording of the format data of the ECC block;

f) performing, during the act b), linear replacement recording for recording the sector data on a replacement block area instead of on the ECC block comprising the sector areas including the sector area or the sector areas determined to have the defect in the act d), thereby completing of recording the format data; and g) recording data indicating that the linear replacement recording is performed in the act f), in the defect management data area.

8. A replacement, processing method comprising the acts of:

a) producing format data of an ECC block comprising (i) a first predetermined number of sectors, each of the sectors comprising a second predetermined number of rows, each of the rows having a third predetermined number of bytes, (ii) a plurality of lateral error correction codes, each of the ECC comprising a number of rows being equal to a number of the rows of each of the sectors, each of the rows of the lateral error correction codes having a fourth predetermined number of bytes, each of the lateral error correction codes being laterally attached to one of the sectors, respectively, and (iii) a vertical error correction code being vertically attached to the sectors, the vertical error correction code comprising a fifth predetermined number of rows, the fifth predetermined number being equal to the number of sectors, each of the rows of the vertical error correction code having a sixth predetermined number of bytes, the sixth predetermined number being obtained by adding the third predetermined number and the fourth predetermined number, the ECC block comprising ECC rows, a number of the ECC rows being obtained by adding the number of the rows of the vertical error correction code and a number obtained by multiplying the number of the rows of each of the lateral error correction codes by the number of the rows of the vertical error correction code, each of the ECC rows having the sixth predetermined number of bytes, the format data being used as a unit when recording and reproducing;

b) completing recording of the format data of the ECC block by recording sector data, respectively, in data areas of sector areas of a recording area of an information recording medium, the number of the sector data and the number of the sector areas being equal to the first predetermined number, the sector data respective comprising (i) the sectors, (ii) the lateral error correction codes laterally attached to the sectors, and (iii) the rows of the vertical error correction code, each being attached to a last one of the rows of each of the sectors, the information recording medium comprising (i) concentric or spiral tracks for recording data, including a plurality of sector areas, each of the sector areas having a predetermined track length, (ii) the recording area comprising part of the plurality of sector areas, (iii) a replacement block area comprising another part of the plurality of sector areas, and (iv) a defect management data area, each of the sector areas comprising one header area and one data area, the header area of each of the sector areas being provided such that address data indicating a position of each of the sector areas on the tracks is recorded in advance in the header area, the data area of each of the sector areas being provided such that the data area is continuous with the header area and predetermined data is recorded in the data area;

c) determining, before the act b), whether or not the address data recorded in each of the data areas is reproduced;

d) determining, before the act b), whether or not an error occurs in each of the ECC rows including an associated one of the rows of the lateral error correction codes, and each of the ECC rows being reproduced from an associated one of the data areas including an associated one of the sectors, and determining a number of errors in each of the ECC rows, thereby determining whether or not a number of the ECC rows having a number of error bytes exceeding a seventh predetermined number is larger than an eighth predetermined number;

e) detecting, before the act b), whether a number of the ECC rows having a number of error bytes exceeding the seventh predetermined number is larger than the eighth predetermined number, by checking the format data of the ECC block comprising the first predetermined number of the sectors of the ECC block reproduced from the data areas;

f) detecting, before the act b), whether at least one of the sector areas has a defect based on results of the acts c) and d), and recording the address data indicating a position of the at least one of the sector areas, in the defect management data area;

g) performing, during the act b), slipping replacement recording for recording an associated sector data piece of the sector data on one of the sector areas following the at least one of the sector areas, the position of the one of the sector areas being indicated by the address data recorded in the defect management data region in the act f), and successively recording other sector data pieces of the sector data on other ones of the sector areas, thereby completing recording of the format data of the ECC block;

h) detecting, during the act b), at least one of the sector areas having a defect, based on results of determination of the acts c) to e) and performing linear replacement recording for recording the sector data on the replacement block area instead of on the ECC block comprising the first predetermined number of sector areas including the at least one of the sector areas, thereby completing recording of the format data; and i) recording data indicating that the linear replacement recording is performed in the act h), in the defect management data area.

* * * * *